United States Patent

Kawamura et al.

[11] Patent Number: 6,128,284
[45] Date of Patent: Oct. 3, 2000

[54] SDH-COMMUNICATION-NETWORK/ ALREADY EXISTING COMMUNICATION NETWORK MONITORING AND INTEGRATING APPARATUS AND ITS METHOD

[75] Inventors: Kazutoshi Kawamura; Ichiro Ayukawa; Shingo Mizuno; Kimihiko Yoshimura; Hisamichi Hazama; Kimio Watanabe, all of Kanagawa, Japan

[73] Assignee: Fujitsu Limited, Kawasaki, Japan

[21] Appl. No.: 09/008,127

[22] Filed: Jan. 16, 1998

[30] Foreign Application Priority Data

Jul. 11, 1997 [JP] Japan .................................. 9-186680

[51] Int. Cl.[7] .................................................. H04Q 11/04
[52] U.S. Cl. .......................................... 370/241; 370/467
[58] Field of Search ...................................... 370/465, 466, 370/467, 401, 241, 242, 243, 244, 247, 248, 251, 907, 522; 709/230, 238, 246

[56] References Cited

U.S. PATENT DOCUMENTS 5,715,249  2/1998  Miyamoto ............................. 370/466

FOREIGN PATENT DOCUMENTS 0572366  12/1993  European Pat. Off. .

OTHER PUBLICATIONS

Carretta et al., "An Evolutionary approach to the Management of SDH Radio Equipments", IEE, pp. 140–147, Oct. 1993.

Primary Examiner—Chi H. Pham
Assistant Examiner—Frank Duong
Attorney, Agent, or Firm—Helfgott & Karas, P.C.

[57] ABSTRACT

An SDH/PDH monitoring and integrating apparatus collects control data generated in a monitoring unit employed in each PDH radio apparatus in a PDH communication network, transforms the control data into a control command that can be processed in an SDH communication network and transmits the control command to the SDH communication network. The control command transmitted to the SDH communication network arrives at an operation system by way of components such as a DCC (Digital Communication Channel), a monitoring unit employed in an SDH radio apparatus or employed in an SDH transmission apparatus and an X.25 network. The operation system extracts control data generated in the PDH communication network from the control command, executing the same processing as that of the conventional PDH monitoring panel for the extracted control data.

10 Claims, 25 Drawing Sheets

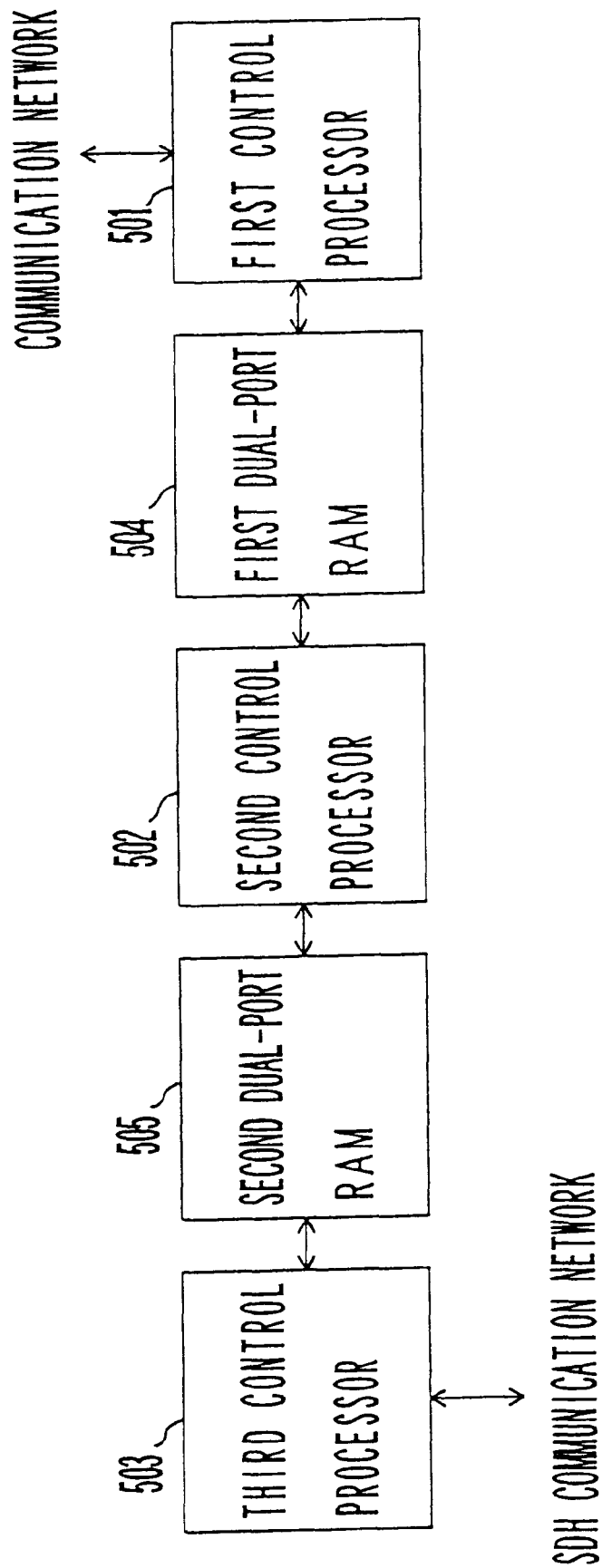
F I G. 5

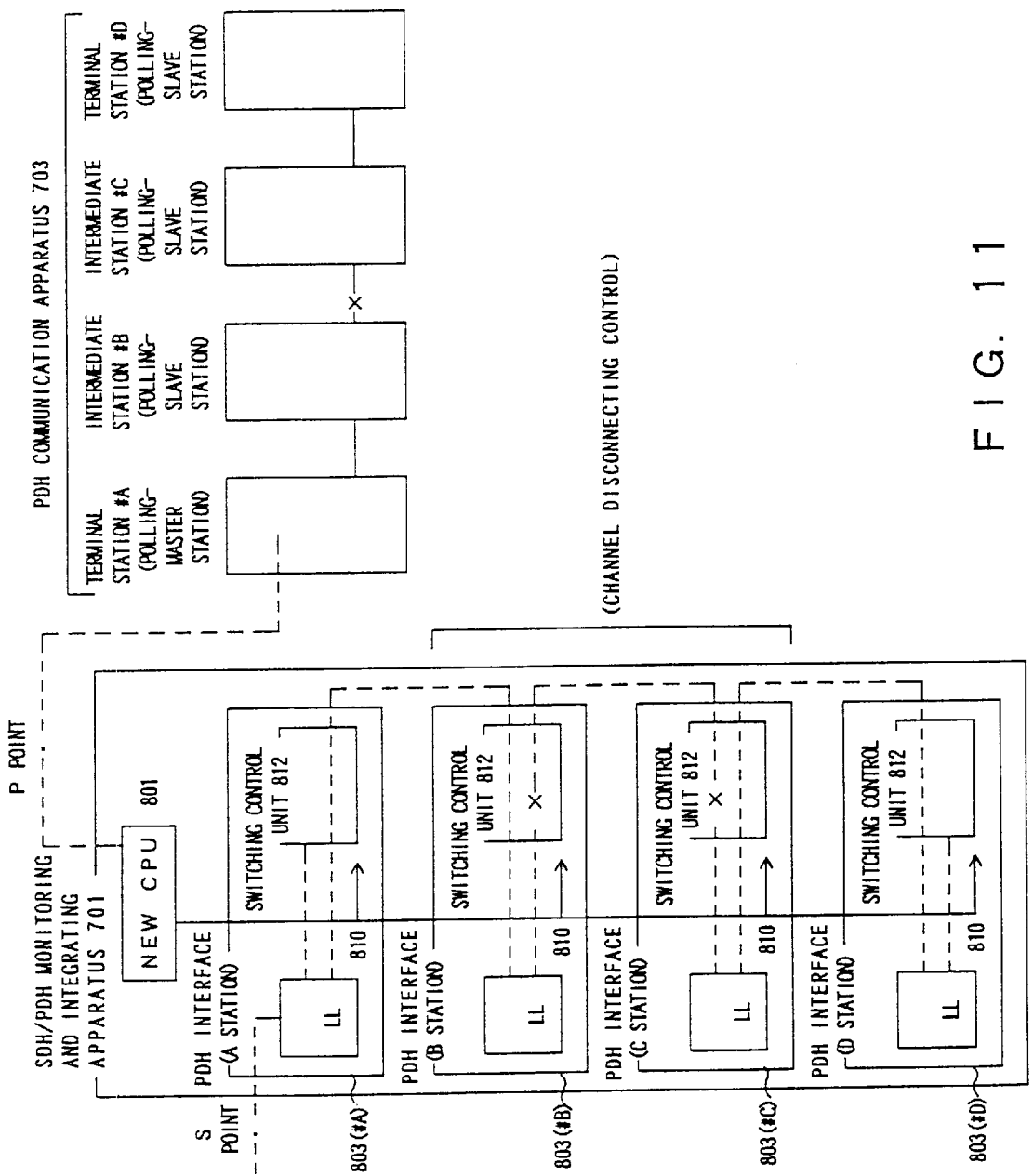
F I G. 11

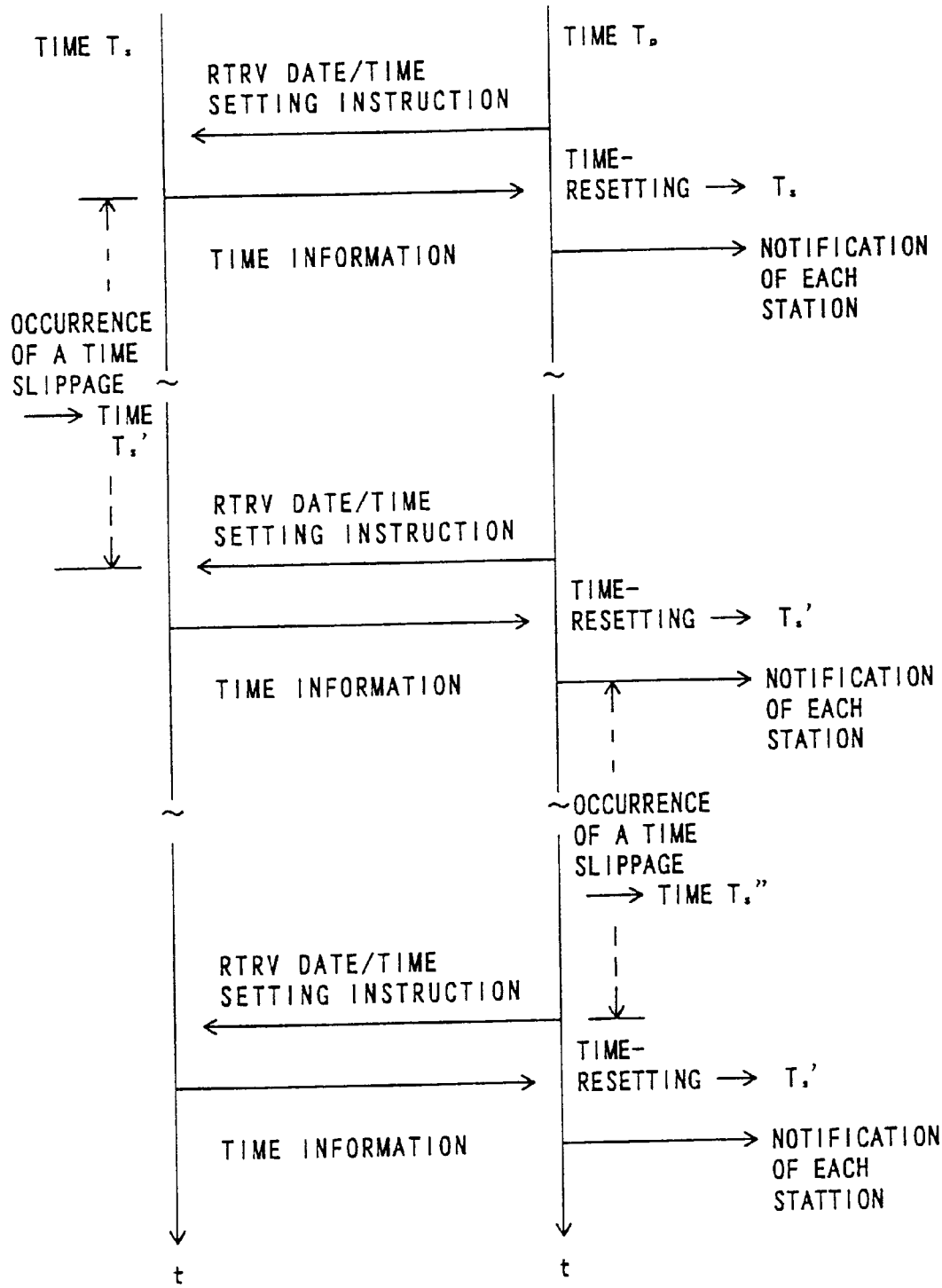
F I G. 1 3

SDH DATA FORMAT

| # 1 | # 2 | # 3 |
|---|---|---|

FIG. 18A

PDH DATA FORMAT

| # 1 | # 4 |
|---|---|

FIG. 18B

1 : RFCOH (A RADIO-PECULIAR OVERHEAD CHANNEL FOR TRANSMITTING A CHANNEL SWITCHING SIGNAL, A WS SIGNAL AND OTHERS)
2 : SOH (AN SDH-SYSTEM OVERHEAD CHANNEL FOR TRANSMITTING A CONTROL SIGNAL, AN ORDER WIRE SIGNAL AND OTHERS)
3 : SDH Pay Load OF ABOUT 155 Mbps
3 : PDH Pay Load OF ABOUT 140 Mbps

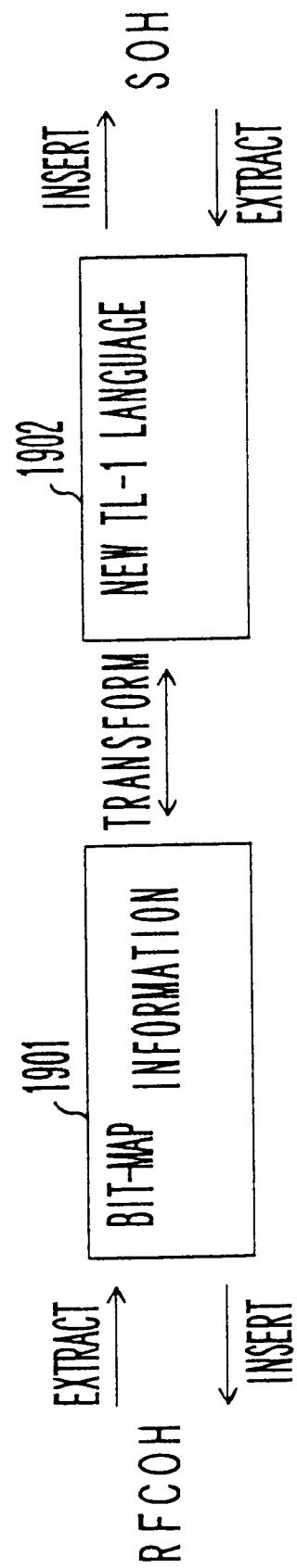
F I G. 1 9

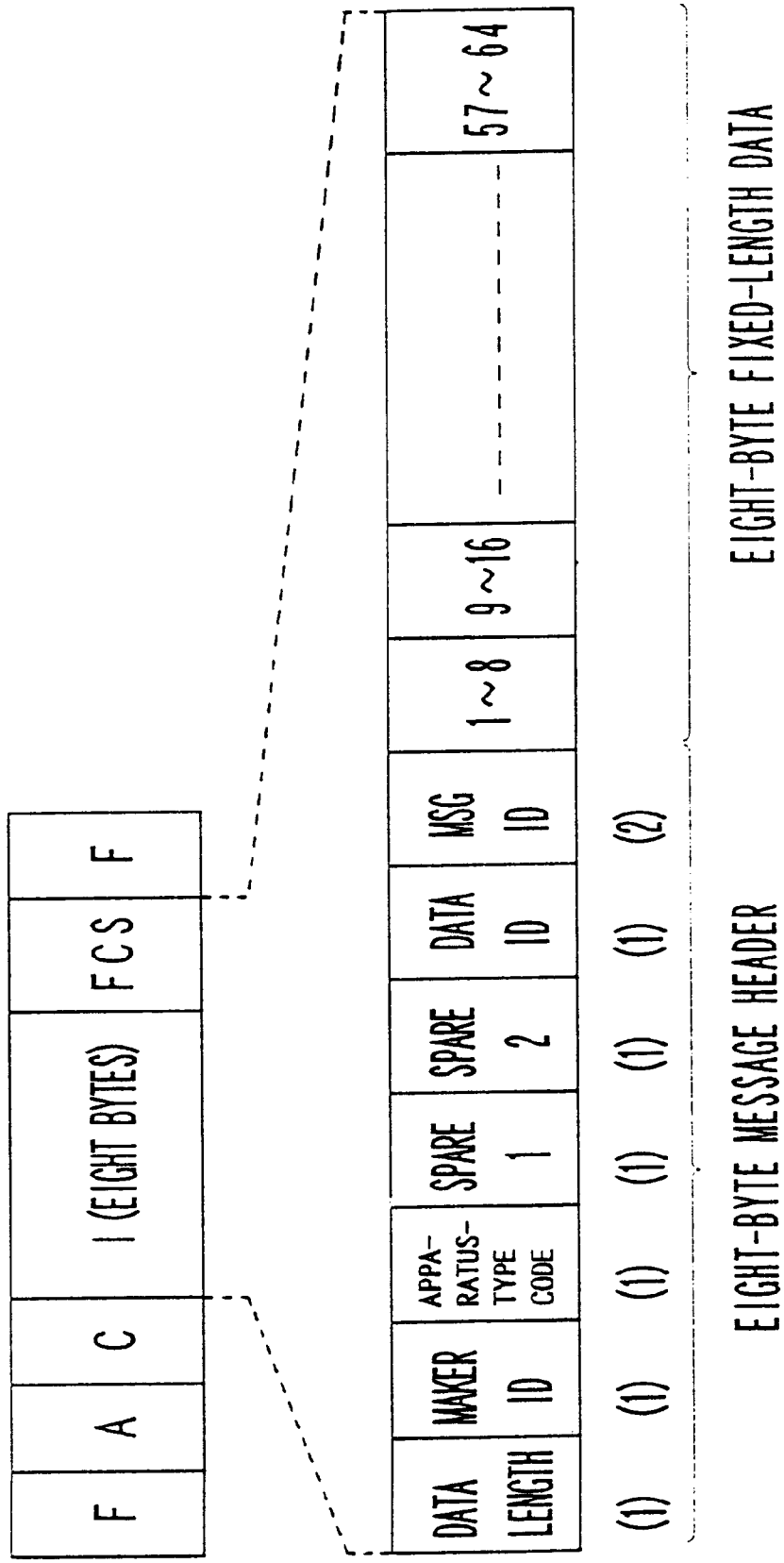
F I G. 2 0

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|

POWER-SUPPLY VOLTAGE | RECEPTION SYSTEM | TRANSMISSION CAPACITY | FREQUENCY BAND

FREQUENCY BAND

| 3 | 2 | 1 | 0 | FREQUENCY BAND |
|---|---|---|---|---|
| 0 | 0 | 0 | 0 | 6.5G |
| 0 | 0 | 0 | 1 | 12G |
| other | | | | reserve |

TRANSMISSION CAPACITY

| 7 | 6 | 5 | 4 | TRANSMISSION CAPACITY |
|---|---|---|---|---|
| 0 | 0 | 0 | 0 | 6Mbps |
| 0 | 0 | 0 | 1 | 13Mbps |
| 0 | 0 | 1 | 0 | 19Mbps |
| 0 | 0 | 1 | 1 | 32Mbps |
| other | | | | reserve |

RECEPTION SYSTEM

| 11 | 10 | 9 | 8 | RECEPTION SYSTEM |
|----|----|---|---|---|
| 0 | 0 | 0 | 0 | SIMPLEX |
| 0 | 0 | 0 | 1 | SD |
| 0 | 0 | 1 | 0 | HSD |
| other | | | | reserve |

POWER-SUPPLY VOLTAGE

| 15 | 14 | 13 | 12 | POWER-SUPPLY VOLTAGE |
|----|----|----|----|---|
| 0 | 0 | 0 | 0 | DC-24V |
| 0 | 0 | 0 | 1 | DC-48V |
| 0 | 0 | 1 | 0 | AC100V |
| 0 | 0 | 1 | 1 | AC200V |
| other | | | | reserve |

FIG. 21

| BIT No. | ALARM NAME | ALARM DESCRIPTION |
|---|---|---|
| 01 | PCM IN | DISCONTINUED PCM INPUT |
| 02 | PCM IN | DISCONTINUED PCM INPUT |
| 03 | PCM IN | DISCONTINUED PCM INPUT |
| 04 | PCM IN | DISCONTINUED PCM INPUT |
| 05 | T PLS | DISCONTINUED TRANSMISSION OF PULSES |
| 06 | T PLS | DISCONTINUED TRANSMISSION OF PULSES |
| 07 | MOD OUT | DECREASED IF OUTPUT |
| 08 | MOD OUT | DECREASED IF OUTPUT |
| 09 | T APC | TRANSMITTED APC ABNORMALITY |
| 10 | T APC | TRANSMITTED APC ABNORMALITY |
| 11 | T OUT | DECREASED TRANSMISSION OUTPUT |
| 12 | T OUT | DECREASED TRANSMISSION OUTPUT |
| 13 | MN R IN | DISCONTINUED MAIN RECEPTION INPUT |
| 14 | MN R IN | DISCONTINUED MAIN RECEPTION INPUT |
| 15 | SD R IN | DISCONTINUED SD RECEPTION INPUT |
| 16 | SD R IN | DISCONTINUED SD RECEPTION INPUT |
| 17 | R APC | RECEIVED APC ABNORMALITY |
| 18 | R APC | RECEIVED APC ABNORMALITY |
| 19 | CR | CARRIER WAVE OUT OFF SYNCHRONIZATION |
| 20 | CR | CARRIER WAVE OUT OFF SYNCHRONIZATION |
| 21 | EYE ERR | DECREASED ERROR RATE |
| 22 | EYE ERR | DECREASED ERROR RATE |
| 23 | ERROR | DETERIORATED ERROR RATE |
| 24 | ERROR | DETERIORATED ERROR RATE |
| 25 | FRAME | FRAME OUT OFF SYNCHRONIZATION |
| 26 | FRAME | FRAME OUT OFF SYNCHRONIZATION |
| 27 | ROUTE | ROUTE-IDENTIFICATION MISMATCH |
| 28 | ROUTE | ROUTE-IDENTIFICATION MISMATCH |
| 29 | PCM OUT | DISCONTINUED PCM OUTPUT |
| 30 | PCM OUT | DISCONTINUED PCM OUTPUT |
| 31 | PCM OUT | DISCONTINUED PCM OUTPUT |
| 32 | PCM OUT | DISCONTINUED PCM OUTPUT |

-: OFF "0" FIXED

FIG. 22

| BIT No. | ALARM NAME | ALARM DESCRIPTION |
|---|---|---|
| 3 3 | PS | DECREASED OUTPUT VOLTAGE |
| 3 4 | PS | DECREASED OUTPUT VOLTAGE |
| 3 5 | IN TEST | ALC SW OFF (TEST) |
| 3 6 | IN TEST | ALC SW OFF (TEST) |
| 3 7 | IN TEST | AGC SW OFF (TEST) |
| 3 8 | IN TEST | AGC SW OFF (TEST) |
| 3 9 | IN TEST | SD CONT OFF (TEST) |
| 4 0 | IN TEST | SD CONT OFF (TEST) |
| 4 1 | DSC | DSC FRAME OUT OFF SYNCHRONIZATION |
| 4 2 | T SW OP | TRANSMISSION SWITCH OPERATION |
| 4 3 | T SW OP | TRANSMISSION SWITCH OPERATION |
| 4 4 | RU SW OP | RECEPTION OPERATION (UNIPOLAR) |
| 4 5 | RU SW OP | RECEPTION OPERATION (UNIPOLAR) |
| 4 6 | RB SW OP | RECEPTION OPERATION (BIPOLAR) |
| 4 7 | RB SW OP | RECEPTION OPERATION (BIPOLAR) |
| 4 8 | IN DIG LB | DIGITAL LOOP-BACK UNDER WAY |
| 4 9 | IN TEST | SWITCH-LOCK UNDER WAY |
| 5 0 | PCM LB | PCM LOOP-BACK UNDER WAY |
| 5 1 | AIS TRANSMISSION | AIS TRANSMISSION |
| 5 2 | AIS TRANSMISSION | AIS RECEPTION |
| 5 3 | DISCONTINUED BOTH SYSTEM INCOMING | DISCONTINUED BOTH SYSTEM INCOMING SIGNALS |
| 5 4 | DISCONTINUED BOTH SYSTEM INCOMING | DISCONTINUED BOTH SYSTEM INCOMING SIGNALS |
| 5 5 | | |
| 5 6 | | |
| 5 7 | | |
| 5 8 | | |
| 5 9 | | |
| 6 0 | | |
| 6 1 | | |
| 6 2 | | |
| 6 3 | | |
| 6 4 | | |

—: OFF "0" FIXED

FIG. 23

| INFORMA-TION No. | INFORMATION NAME | INFORMATION DESCRIPTION | DISPLAY RANGE |
|---|---|---|---|
| 0 1 | T OUT POW | TRANSMISSION OUTPUT | 0.0 ~+5.0 |
| 0 2 | T OUT POW | TRANSMISSION OUTPUT | 0.0 ~+5.0 |
| 0 3 | MN R IN LEV | MN RECEPTION LEVEL | 0.0 ~+9.9 |
| 0 4 | MN R IN LEV | MN RECEPTION LEVEL | 0.0 ~+9.9 |
| 0 5 | SD R IN LEV | SD RECEPTION LEVEL | 0.0 ~+9.9 |
| 0 6 | SD R IN LEV | SD RECEPTION LEVEL | 0.0 ~+9.9 |
| 0 7 | COMB LEV | COMB RECEPTION LEVEL | 0.0 ~+9.9 |
| 0 8 | COMB LEV | COMB RECEPTION LEVEL | 0.0 ~+9.9 |
| 0 9 | +5.3V OUT* | SECONDARY-SIDE POWER SUPPLY (+5V) | 0.0 ~+8.0 |
| 1 0 | +5.3V OUT* | SECONDARY-SIDE POWER SUPPLY (+5V) | 0.0 ~+8.0 |
| 1 1 | +10V OUT | SECONDARY-SIDE POWER SUPPLY (+10V) | 0.0 ~+14.0 |
| 1 2 | +10V OUT | SECONDARY-SIDE POWER SUPPLY (+10V) | 0.0 ~+14.0 |
| 1 3 | -5.2V OUT | SECONDARY-SIDE POWER SUPPLY (-5V) | 0.0 ~-8.0 |
| 1 4 | -5.2V OUT | SECONDARY-SIDE POWER SUPPLY (-5V) | 0.0 ~-8.0 |
| 1 5 | -10V OUT | SECONDARY-SIDE POWER SUPPLY (-10V) | 0.0 ~-14.0 |
| 1 6 | -10V OUT | SECONDARY-SIDE POWER SUPPLY (-10V) | 0.0 ~-14.0 |

NOTICE 1: A NEGATIVE ITEM IS REPORTED AS A FIXED VALUE OF $+0 \times 10^{+0}V$
NOTICE 2: THE +5V INFORMATION OF THE MEDIUM CAPACITY IS +5.0V

FIG. 25

SDH-COMMUNICATION-NETWORK/ ALREADY EXISTING COMMUNICATION NETWORK MONITORING AND INTEGRATING APPARATUS AND ITS METHOD

BACKGROUND OF THE INVENTION

1. Field of the Invention

The present invention relates to a technology for monitoring communication in an extended network wherein already existing communication apparatuses such as PDH communication apparatuses are each replaced by an SDH communication apparatus.

2. Description of the Related Art

In recent years, while the demand for improved reliability o f a communication network as a whole is getting even stronger, communication networks and communication lines supplied by different vendors as well communication lines implemented by a variety of media get connected to each other accompanying the progress of the integration of communication networks. For this reason, there is a demand for a monitoring system implemented for controlling the integrated communication network as a whole with a high degree of efficiency and an advanced technique. To put it concretely, by monitoring a variety of states in the communication network as monitored data, the occurrence of a failure can be inferred in advance, allowing a down state of the network to be avoided as one of advanced techniques to control the network.

As an example of implementation of a communication network to be integrated, a PDH (Plesiochronous Digital Hierarchy) communication network is known. The PDH communication network is a generic name of communication networks already existing prior to development of an SDH (Synchronous Digital Hierarchy) communication network which shows a remarkable growth in recent years. The SDH communication network is a new communication network constructed on the basis of a protocol which is standardized in conformity with recommendations made by the ITU-T and others.

That is, activities of integrating a PDH communication network constructed by using the conventional free (independent) protocol into an SDH communication network based on a new technology are intensified and, as a result, the demand for integration of a PDH monitoring system into an SDH monitoring system is rising. For this reason, it becomes necessary to transform the format of control signals generated by a PDH monitoring system implemented in an already existing PDH communication apparatus into a format that can be handled by an SDH monitoring system implemented in an SDH communication network without affecting the main signal network.

DESCRIPTION OF THE CONVENTIONAL PDH MONITORING SYSTEM

An example of a PDH monitoring system implemented in the conventional PDH communication network is shown in FIG. 1.

As shown in the figure, a plurality of PDH radio apparatuses 101 compose a PDH communication network. The PDH radio apparatuses each serve either as a terminal station or an intermediate station which is also referred to as a repeater station. A PDH radio apparatus 101 comprises a main-signal communicating unit 102 and a PDH monitoring unit which is composed of a main CPU 103 and an interface (I/O) unit 104. Main-signal communicating units 102 are connected to each other by a main-signal channel 105 which is implemented by using a main band of the radio band. Each of the main-signal communicating units 101 is used for executing communication of main signals. Main CPUs 103 are connected to each other by serial-data channels 106 and 107 which are each implemented by using a portion of the radio band. Each of the main CPUs 103 is used for executing communication of monitored data based on a polling technique to be described later. Each of the main-signal communicating units 102 is provided with functions such as a transmitting (TX) function, a receiving (RX) function, a modulating (MOD) function and a demodulating (DEM) function. Each of the serial-data channels 106 is used for transferring binary data such as an alarm and condition data. On the other hand, each of the serial-data channels 107 is used for transferring multi-value data, that is, measured values of performance data.

In the conventional PDH monitoring system, one of the PDH radio apparatuses (terminal and intermediate stations) 101 which is activated initially serves as a polling-master station. In the conventional PDH communication network shown in FIG. 1, the repeater station #B is the polling-master station. The other PDH radio apparatuses 101 in the communication network, that is, the terminal stations #A and #D and the repeater station #C shown in the figure are each a polling-slave station. When a polling-master station polls a specific polling-slave station, a polling signal specifying the specific polling-slave station is transmitted to all PDH radio apparatuses. The called PDH radio apparatus, that is, the specific polling-slave station, transmits monitored data obtained in the PDH radio apparatus itself to all the other PDH radio apparatuses. Of course, the polling-master station is capable of polling itself.

The polling-master station executes only control of polling timing but not other kinds of control such as keeping monitored data.

A route-information preserving apparatus 108 comprises a main CPU 109 and a memory unit 110. The main CPU 109 intercepts monitored data transmitted by each of the PDH radio apparatuses in response to a request for data made by the polling-master station by using a polling technique and stores the monitored data in the memory unit 110.

A PDH monitoring panel 111 includes a personal computer 112. When it is desired to display monitored data obtained by a PDH radio apparatus 101 in the PDH monitoring panel 111 or, in actuality, the personal computer 112, first of all, a request for a transfer of monitored data is issued to the main CPU 109 employed in the route-information preserving apparatus 108 by way of an RS232C interface. In response to this request, the main CPU 109 retrieves monitored data of all PDH radio apparatuses from the memory unit 110 in which the monitored data is stored, transmitting the data to the PDH monitoring panel 111.

When it is desired to control a PDH radio apparatus 101 from the PDH monitoring panel 111, first of all, the PDH monitoring panel issues a command to transfer functions of the polling-master station to the PDH monitoring panel 111 in order to let the PDH monitoring panel 111 serve as a polling-master station. Then, the PDH radio apparatus 101 is controlled with polling timing set for the PDH radio apparatus.

Monitored data collected by the PDH monitoring panel 111 in the memory unit 110 of the route-information preserving apparatus 108 can be binary data and multi-value data.

Examples of binary data are an alarm and condition data which are transmitted to urgently inform the user of a failure.

On the other hand, multi-value data is measured values of performance data obtained by measurements of a variety of performances in the PDH radio apparatuses 101 at a predetermined frequency. That is why time accuracy is required in the collection of multi-value data.

To put it concretely, the PDH radio apparatus 101 keeps track of the lapse of time in synchronization with a clock embedded therein. The main CPU 103 employed in the PDH radio apparatus 101 counts the number of error bits generated by the main-signal communicating unit 102 within a short period of several seconds. As a period of 15 minutes lapses, the total number of bit errors cumulated in the 15-minute period and the bit error rate (BER) are stored as a history data. The clocks of all the PDH radio apparatuses 101 composing a PDH communication network are synchronized in advance by a command issued by the PDH monitoring panel 111.

When it is necessary to display the number of bit errors and a bit error rate (BER) in the main-signal communicating unit 102 employed in a PDH radio apparatus 101 on the PDH monitoring panel 111, the PDH monitoring panel 111 issues a request to the PDH radio apparatus 101 to collect results of measurement, multi-value data representing performance data.

The performance data includes current data, a plurality of pieces of history data and the response time at which the performance data is transmitted to the PDH monitoring panel 111. The current data is the number of bit errors occurring during the past 15-minute period lapsing since the issuance of the request by the PDH monitoring panel 111. The pieces of history data are information obtained during a plurality of past 15-minute periods. Each piece of history data is the number bit errors occurring during a past 15-minute period or a bit error rate (BER).

Receiving the performance data, the PDH monitoring panel 111 displays bit-error counts and bit error rates (BERs) for the PDH radio apparatus 101 in question for the period prior to the time the request was issued.

In the PDH communication network described above, PDH radio apparatuses and transmission lines supplied by different vendors and transmission lines implemented by a variety of media such as radio or light allow main signals to be transmitted among the PDH radio apparatuses and through the lines. However, a monitoring system is not integrated. To put it more concretely, in the PDH communication network shown in FIG. 1, the serial-data channels 106 and 107 for communicating monitored data are provided in addition to the main-signal channel 105 having a typical transmission rate of 140 megabits per second. The protocols of the serial-data channels 106 and 107 vary from vendor to vendor as well as from communication medium to communication medium.

As a result, a first PDH communication network comprising apparatuses and transmission lines supplied by a first vendor and the transmission lines implemented by a first communication medium can not be controlled from a second PDH communication network comprising apparatuses and transmission lines supplied by a second vendor and the transmission lines implemented by a second communication medium.

SDH MONITORING SYSTEM

Next, an example of an SDH monitoring system implemented in an SDH communication network is explained by referring to FIG. 2.

As shown in the figure, each of SDH radio apparatuses 201 composing the SDH communication network can serve either as a terminal station or an intermediate station as is the case with the PDH radio apparatus 101 shown in FIG. 1.

The SDH communication network is characterized in that integration of a control system for apparatuses and transmission lines supplied by different vendors and transmission lines implemented by different media is taken into consideration. To put it more concretely, there is provided a dedicated overhead channel for transmitting monitored data (control information) which is known as an overhead of a main signal. The overhead channel is prescribed so as to be capable of carrying out communication among apparatuses supplied by different vendors and among transmission lines implemented by different media. In the SDH communication network, the overhead channel is standardized as a data communication channel (DCC) so that the main-signal communicating unit 202 employed in the SDH radio apparatus 201 is capable of processing signals transmitted through a main-signal channel 206 and a DCC 207 in a uniform manner.

The SDH monitoring unit employed in the SDH radio apparatus 201 comprises an SV (supervisory) unit 203, an HL unit 204 and an LL unit 205. First of all, the SV unit 203 monitors channels and interfaces among pieces of equipment employed in the SDH radio apparatus 201 in order to collect alarms, condition data and performance data. To put it more concretely, the SV unit 203 periodically fetches information on failures reported in a bit-map format by the pieces of equipment through a CPU bus in order to detect a failure from the information. A detected failure, if any, is reported to the HL unit 204 right away. Performance data such as the number of bit errors occurring on a channel is recorded in each SDH radio apparatus. The SV unit 203 periodically fetches and accumulates measured values of the performance data and periodically informs the HL unit 204 of the cumulative measurement value. Each time the SV unit 203 fetches a recorded count value from an SDH radio apparatus, the fetched count value in the SDH radio apparatus is reset.

The HL unit 204 transforms monitored data collected by the SV unit 203 into a predetermined monitored language.

The LL unit 205 includes the monitored language produced by the HL unit 204 as standardized protocol data in the SDH communication network to be transmitted to the main-signal communicating unit 202 or an X.25 network. To put it more concretely, in the SDH communication network shown in FIG. 2, the SDH radio apparatus 201 serving as terminal station #A stores the monitored language produced by the HL unit 204 as data prescribed by an ITU-T X.25 protocol, a communication protocol of a packet network (the X.25 network) 208 which serves as gateway network element. By the same token, the SDH radio apparatuses 201 which serve as intermediate stations #B and #C and terminal station #D store the monitored language produced by the HL unit 204 as data for the DCC 207. The resulting protocol data is passed to their respective main-signal communicating units 202.

An operation system 209, which is implemented typically by a work station, establishes sessions all the time with the SDH radio apparatuses 201 through an X.25 network 208 and a DCC 207, receiving informative messages transmitted periodically or spontaneously by the SDH radio apparatuses in order to monitor the SDH radio apparatuses 201 and the channels. A monitored language exchanged between an SDH radio apparatuses 201 and an operation system 209 is a language common to all the SDH radio apparatuses 201 which can be processed by the SDH radio apparatuses 201.

As described above, in an environment of an integrated communication network comprising only SDH communication networks, the communication protocols of the main-signal channels 206 and the DCCs 207 as well as the communication protocol of the X.25 networks 208 for monitored data are standardized. As a result, a first SDH communication network comprising apparatuses and transmission lines supplied by a first vendor and the transmission lines implemented by a first communication medium can be controlled from a second SDH communication network comprising apparatuses and transmission lines supplied by a second vendor and the transmission lines implemented by a second communication medium.

FIG. 3 is a diagram showing the configuration of an integrated network comprising a PDH communication network and an SDH communication network which have the characteristics described above. Components of FIG. 3 having functions identical with those shown in FIGS. 1 and 2 are denoted by the same reference numerals as the latter. In addition, the SDH communication network also includes SDH transmission apparatuses (or SDH communication network elements) 301, which relay optical transmission lines, besides SDH radio apparatuses 201.

In the configuration of the integrated communication network shown in FIG. 3, the PDH monitoring system for the PDH communication network works in the same way as that shown in FIG. 1. That is, monitored data is transmitted by the PDH monitoring unit (which corresponds to the main CPU 103 and the I/O unit 104 shown in FIG. 1) employed in a PDH radio apparatus 101 by way of the route-information preserving apparatus 108 in the PDH communication network to the PDH monitoring panel 111 to be monitored thereby. Likewise, the SDH monitoring system for the SDH communication network works in the same way as that shown in FIG. 2. That is, monitored data is transmitted by the SDH monitoring unit (which corresponds to the SV unit 203, the HL unit 204 and the LL unit 205 shown in FIG. 2) employed in an SDH radio apparatus 201 or an SDH transmission apparatus 301 by way of a DCC 207 and an X.25 network 208 in the SDH communication network to the operation system 209 to be monitored thereby.

In the configuration shown in FIG. 3, a main signal in the PDH communication network and a main signal in the SDH communication network are linked to each other by a PDH interface unit 302.

As a communication network, the SDH communication network is expected to become popular in the years to come. Since a number of PDH communication networks are actually still active, however, an integrated communication network comprising PDH and SDH communication networks can not be controlled as a whole with a high degree of efficiency unless integrated control of the integrated communication network is taken into consideration.

In the PDH control system implemented on a PDH control network, the PDH radio apparatus and the transmission line vary from vendor to vendor and, implemented by different communication media, the transmission line also has characteristics different from each other as well, giving rise to a problem that monitored data generated in a PDH communication network can not be transformed into monitored data to be processed in an SDH communication network. That is, so far, a DCC (Data Communication Channel) can not be included in the PDH interface 302.

SUMMARY OF THE INVENTION

Having the background described above, it is thus an object of the present invention to transform the format of control signals generated by a PDH monitoring system implemented in an already existing PDH communication apparatus into a format that can be handled by an SDH monitoring system implemented in an SDH communication network without affecting the main-signal network so as to allow the PDH communication network to be integrated into the SDH communication network.

FIG. 4 is a first block diagram showing the configuration of an integrated communication network of the present invention which comprises SDH and already existing communication networks.

In essence, the present invention provides an SDH communication NETWORK/ALREADY existing communication network monitoring and integrating technology for integrating monitoring systems of a synchronous digital hierarchy (SDH) communication network and an already existing communication network such as a plesiochronous digital hierarchy (PDH) communication network.

In the configuration shown in FIG. 4, a plurality of already existing communication-network communication apparatuses such as PDH radio apparatuses 403 constitute an already existing communication network such as a PDH communication network. On the other hand, the SDH communication network comprises typically a plurality of SDH radio apparatuses 404 and SDH transmission apparatuses 405.

According to the present invention, an SDH/PDH monitoring and integrating apparatus 401 collects control data (or monitored data) generated by the already existing communication network communication apparatuses, that is, PDH radio apparatuses 403, at a protocol-data point P in the already existing communication network.

Then, the SDH/PDH monitoring and integrating apparatus 401 transforms the control data into a control command that can be processed by the SDH communication network. The control command is a command described in a new TL1 language.

Finally, the SDH/PDH monitoring and integrating apparatus 401 outputs the control command to a protocol-data point S in the SDH communication network, an X.25 back-to-back connection interface 407.

As described above, the control command representing control data generated in the already existing communication network, the PDH communication network in this case, is transmitted to the SDH communication network to be eventually delivered to the operation system 402 by way of components such as an X.25 back-to-back connection interface 407, the monitoring unit of an SDH radio apparatus 404 or an SDH transmission apparatuses 405 and DCCs (Data Communication Channels) 406.

The operation system 402 extracts control data generated in the already existing PDH communication network from the control command transmitted thereto, carries out the same processing as the conventional already existing communication network monitoring panel (that is, the PDH monitoring panel) for the control command.

On the other hand, if control data that can be processed by the already existing PDH communication network is generated in the operation system 402 during the same processing as the conventional already existing communication network monitoring panel (that is, the PDH monitoring panel), the operation system 402 generates a control command including the control data, outputting the command to the SDH communication network.

The control command is eventually delivered to the SDH/PDH monitoring and integrating apparatus 401 by way of components such as DCCs (Data Communication Channels) 406, the monitoring unit of an SDH radio apparatus 404 or an SDH transmission apparatus 405 as well as an X.25 back-to-back connection interface 407.

The SDH/PDH monitoring and integrating apparatus 401 collects control commands from the SDH communication network, extracting only one destined for the already existing PDH communication network from the collected commands.

The SDH/PDH monitoring and integrating apparatus 401 transforms the extracted control command into control data that can be processed by the already existing PDH communication network.

The SDH/PDH monitoring and integrating apparatus 401 then transmits the control data to the already existing PDH communication network.

The control data is received by the monitoring unit employed in an already existing communication network communication apparatus, that is, a PDH radio apparatus 403 to which the control data is addressed. Receiving the control data, the PDH radio apparatus 403 executes control in accordance with the control data.

The configuration of an integrated communication network comprising an already existing communication network (a PDH communication network) already in operation and an already existing or newly installed SDH communication network in accordance with the present invention as described above allows the user to integrate a monitoring system in an existing communication network with an SDH monitoring system without disconnecting the main signal, making the conventional PDH monitoring panel of the already existing PDH communication network no longer necessary.

FIG. 5 is a second block diagram showing a first configuration of the SDH/PDH monitoring and integrating apparatus 401 provided by the present invention in the integrated communication network shown in FIG. 4.

A first control processor 501 employed in the SDH/PDH monitoring and integrating apparatus 401 collects control data generated in the already existing communication network and outputs the collected control data to a second control processor 502. The second control processor 502 transmits control data for the already existing communication network to the already existing communication network through the first control processor 1.

To put it in detail, the second control processor 502 transforms the control data supplied thereto by the first control processor 501 into a control command that can be processed by the synchronous digital hierarchy communication network and outputs the control command to a third control processor 503. Conversely, the second control processor 502 extracts a control command destined for the already existing communication network from control commands supplied thereto by the third control processor 503, transforms the extracted control command into control data that can be processed by the already existing communication network and outputs the control data resulting from the transformation to the first control processor 501.

The third control processor 503 outputs a control command supplied thereto by the second control processor 502 to the synchronous digital hierarchy communication network and, conversely, collects control commands from the synchronous digital hierarchy communication network and transmits the collected control commands to the second control processor 502.

In the configuration provided by the present invention as described above, control data is exchanged by the first and second control processors 501 and 502 by way of a first dual-port random-access memory unit 504.

By the same token, control commands are exchanged by the third and second control processors 503 and 502 by way of a second dual-port random-access memory unit 505.

In the configuration provided by the present invention as shown in FIG. 5, control data to be processed in the already existing communication network is output by the first control processor 501 to the already existing communication network with proper timing. By the same token, a control command to be processed in the SDH communication network is output by the third control processor 503 to the SDH communication network with proper timing. As a result, transformation from control data into a control command and vice versa can be carried out by the second control processor 502 with a high degree of efficiency.

The second and third control processors 502 and 503 can each be implemented by the same component as a processor employed in the monitoring unit of an SDH radio apparatus 404 or an SDH transmission apparatus 405 in the SDH communication network shown in FIG. 4. In this way, it is possible to provide an SDH/PDH monitoring and integrating apparatus at a low cost.

FIG. 6 is a third block diagram showing a second configuration of an SDH/PDH monitoring and integrating apparatus 401 provided by the present invention in the integrated communication network shown in FIG. 4.

As shown in FIG. 6, the configuration comprises as many sets #1 to #N each denoted by reference numeral 601 as already existing communication network communication apparatuses (that is, PDH radio apparatuses 403 shown in FIG. 4) installed in the already existing communication network. Provided for a PDH radio apparatus 403, each of the sets #1 to #N comprises a second control processor 502, a third control processor 503, a first dual-port random-access memory unit 504 and a second dual-port random-access memory unit 505.

The second and third control processors 502 and 503 pertaining to a set 601 process control data generated by an already existing communication network communication apparatus for which the set 601 is provided.

The first control processor 501 outputs control data collected from an already existing communication network communication apparatus in the already existing communication network to a second control processor 502 pertaining to a set 601 provided for the already existing communication network communication apparatus.

The configuration provided by the present invention as described above allows transformation from control data into a control command and vice versa to be carried out with a higher degree of accuracy for each already existing communication network communication apparatus in the already existing communication network, that is, the PDH communication network.

The configuration shown in FIG. 6 further includes a switch control apparatus 602 for invalidating any one of the sets 601 (that is, sets #1 to #N) which each comprise second and third control processors 502 and 503 depending on the state of a channel failure occurring in the already existing communication network.

As a result, in this configuration, in the event of a channel failure occurring in the already existing communication network, that is, the PDH communication network, it is possible to easily detach a portion in which the failure has occurred, allowing the state of the already existing communication network, that is, the PDH communication network, to be grasped in the SDH communication network with ease.

In addition, the present invention can be implemented into a configuration in which the first control processor 501 can acquire time information of the synchronous digital hierarchy communication network by requesting the second control processor 502 and output the time information to the already existing communication network as control data.

In such a configuration, it is possible to avoid a state in which there is a discrepancy between the start and/or the end of a measurement of performance data carried out in the SDH communication network and the start and/or the end of a measurement of performance data carried out in the already existing communication network, that is, the PDH communication network. As a result, more accurate integrated control can be carried out.

In addition, in the present invention, if the control data is performance data, the first control processor 501 outputs a request to reset performance data at a boundary point of time between periods of measurement of performance data carried out by the second control processor 502 to the already existing communication network. In this way, it is possible to build a configuration for carrying out correction by adding performance data collected by the first control processor 501 at the boundary point of time to performance data to be informed by the first control processor 501 to the second control processor 502 for the first time at a point of time following the boundary point of time.

With this configuration, it is possible to prevent a measured value of performance data from being lost due to a difference in measurement period of performance data between the SDH communication network and the already existing communication network, that is, the PDH communication network.

BRIEF DESCRIPTION OF THE DRAWINGS

Other objects, features and preferred embodiments of the present invention will be described in a way easy for the people in relevant industries to understand by referring to the following diagrams wherein:

FIG. 5 is a second block diagram showing a first configuration of the SDH/PDH monitoring and integrating apparatus provided by the present invention in the integrated communication network shown in FIG. 4;

FIG. 11 is an explanatory diagram showing control in the event of a route monitoring disability due to a disconnected PDH channel;

FIG. 13 is an explanatory diagram showing a sequence of operations carried out by a NEW CPU for resetting time;

FIGS. 18A and 18B are diagrams showing formats of data in the SDH and PDH communication networks respectively;

FIG. 19 is an explanatory diagram showing transformation from PDH data into SDH data and vice versa;

FIG. 20 is a diagram showing the data format of an alarm in a PDH communication network;

FIG. 21 is a diagram showing the data format of a message ID;

FIG. 22 shows a table of alarms;

FIG. 23 shows a table of alarms, a continuation to that shown in FIG. 22;

FIG. 25 is an explanatory table of measurement items.

DETAILED DESCRIPTION OF THE PREFERRED EMBODIMENTS

The present invention will become more apparent from a careful study of the following detailed description of a preferred embodiment with reference to the accompanying diagrams.

Basic Configuration and Operation

Figure 7:
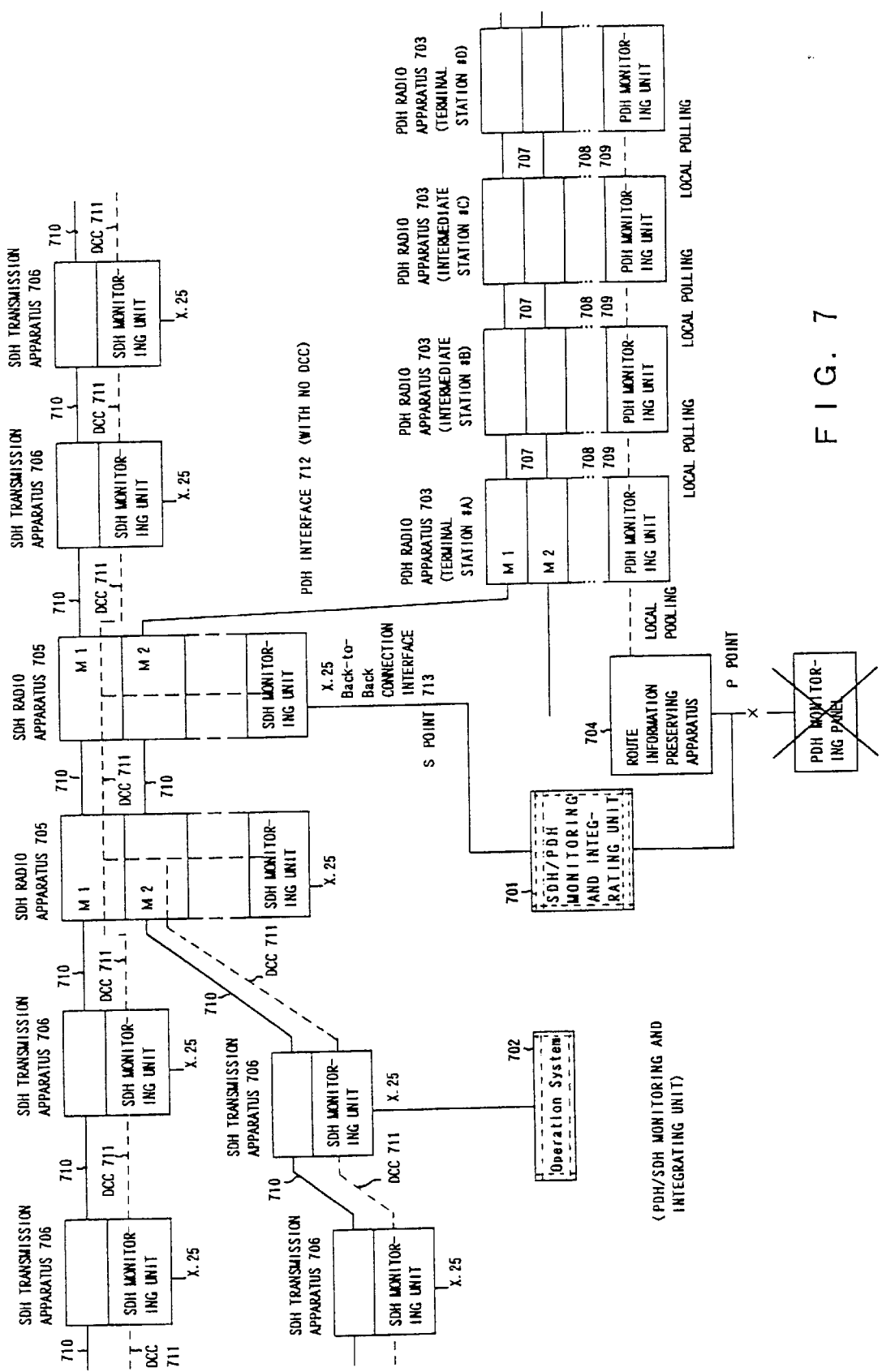
FIG. 7 is a diagram showing a system configuration of a preferred embodiment provided by the present invention.

FIG. 7 is a diagram showing a system configuration of a preferred embodiment provided by the present invention.

Figure 1:
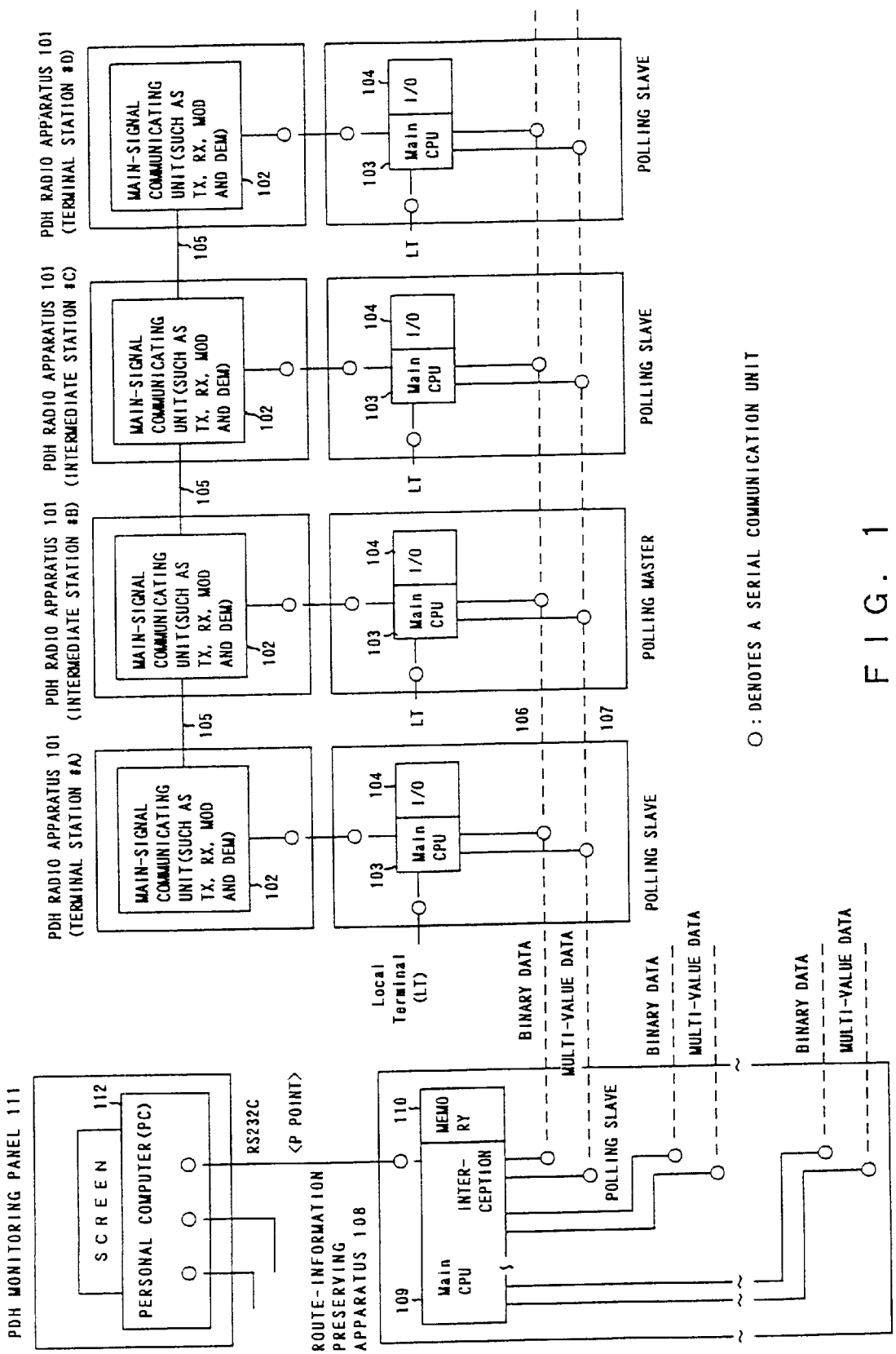
FIG. 1 is a diagram showing an example of a PDH monitoring system implemented in the conventional PDH communication network.
Figure 2:
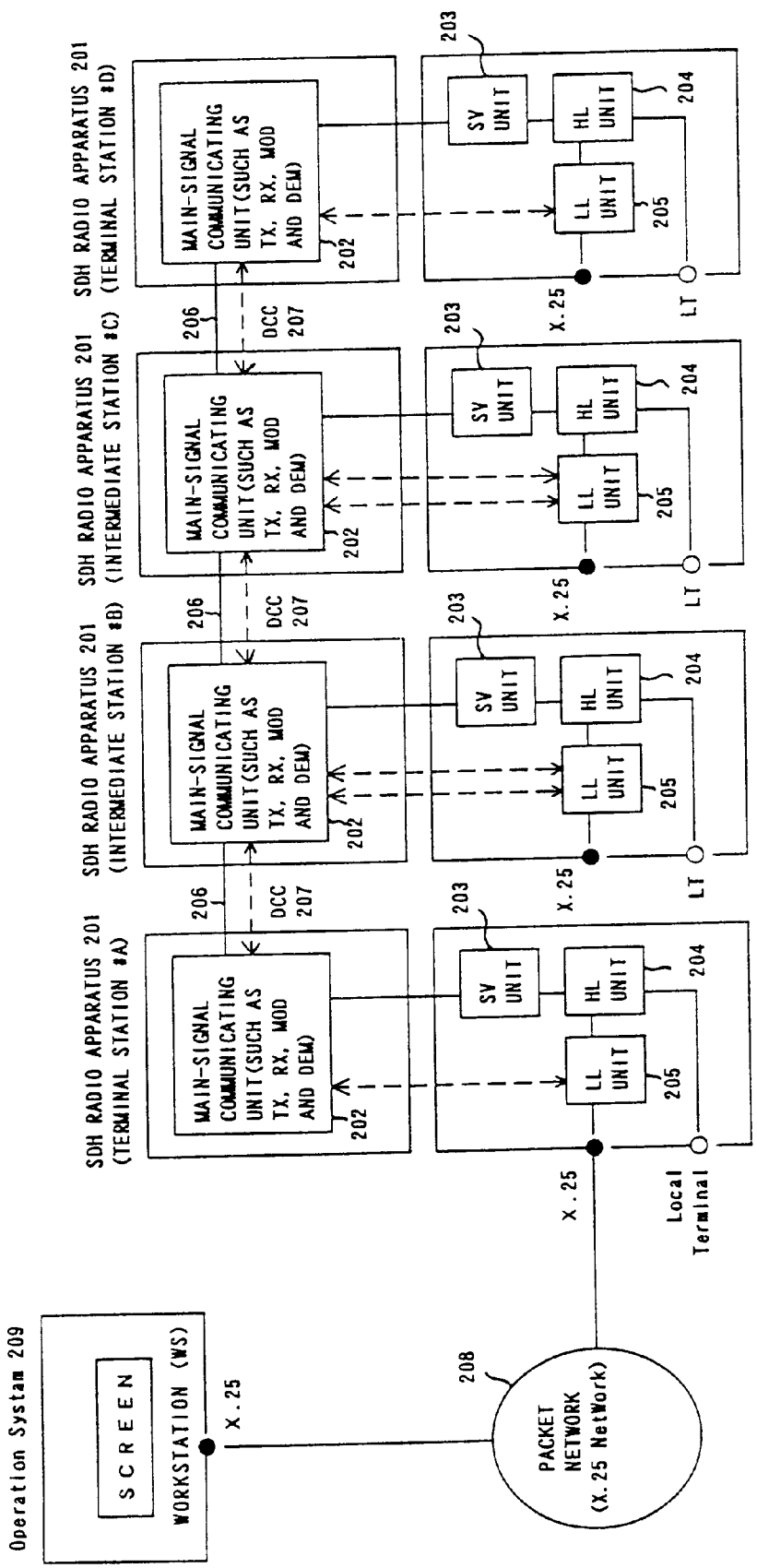
FIG. 2 is a diagram showing an example of an SDH monitoring system implemented in an SDH communication network.
Figure 3:
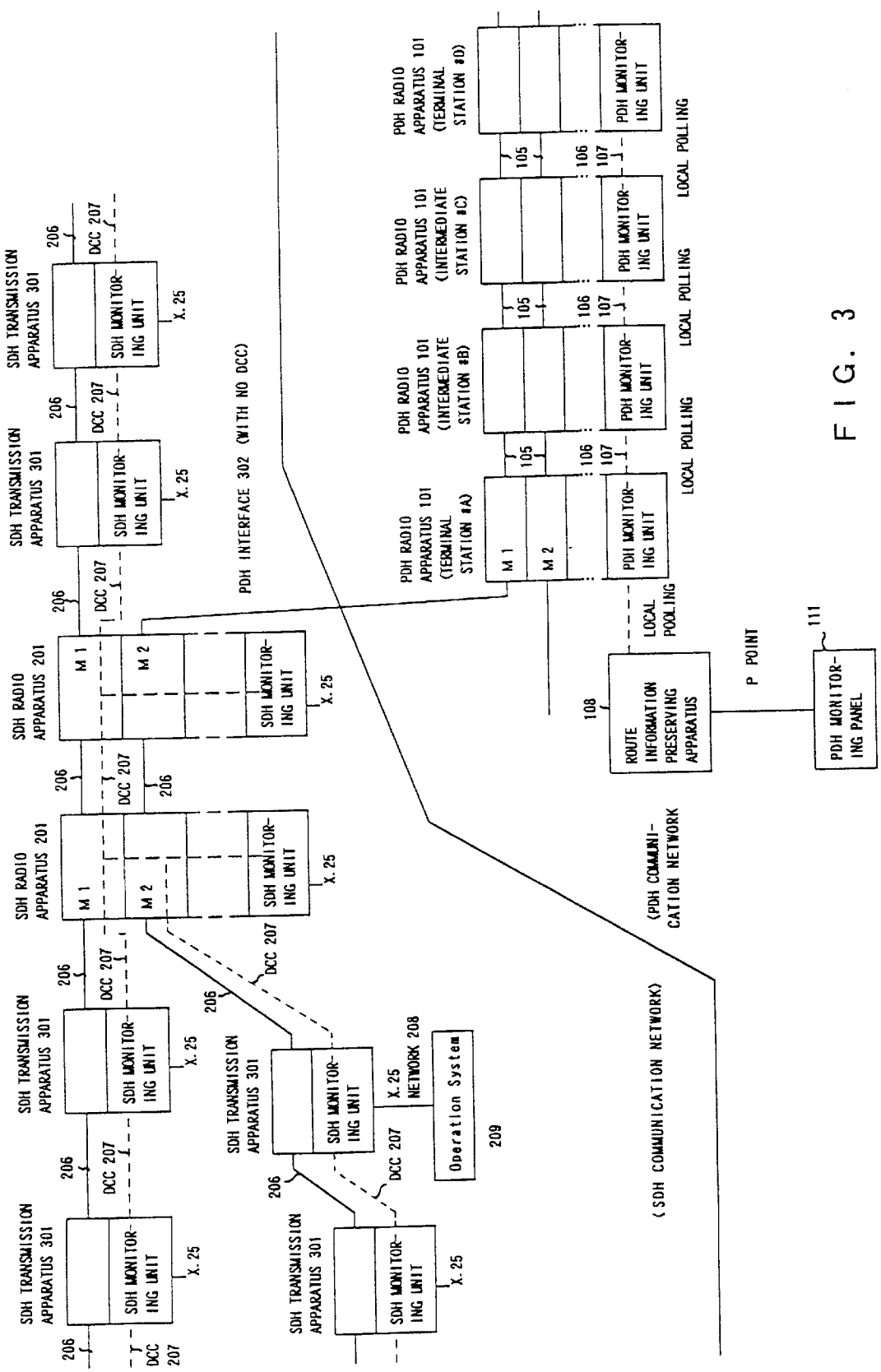
FIG. 3 is a diagram showing the configuration of a conventional integrated network comprising a PDH communication network and an SDH communication network.
Figure 4:
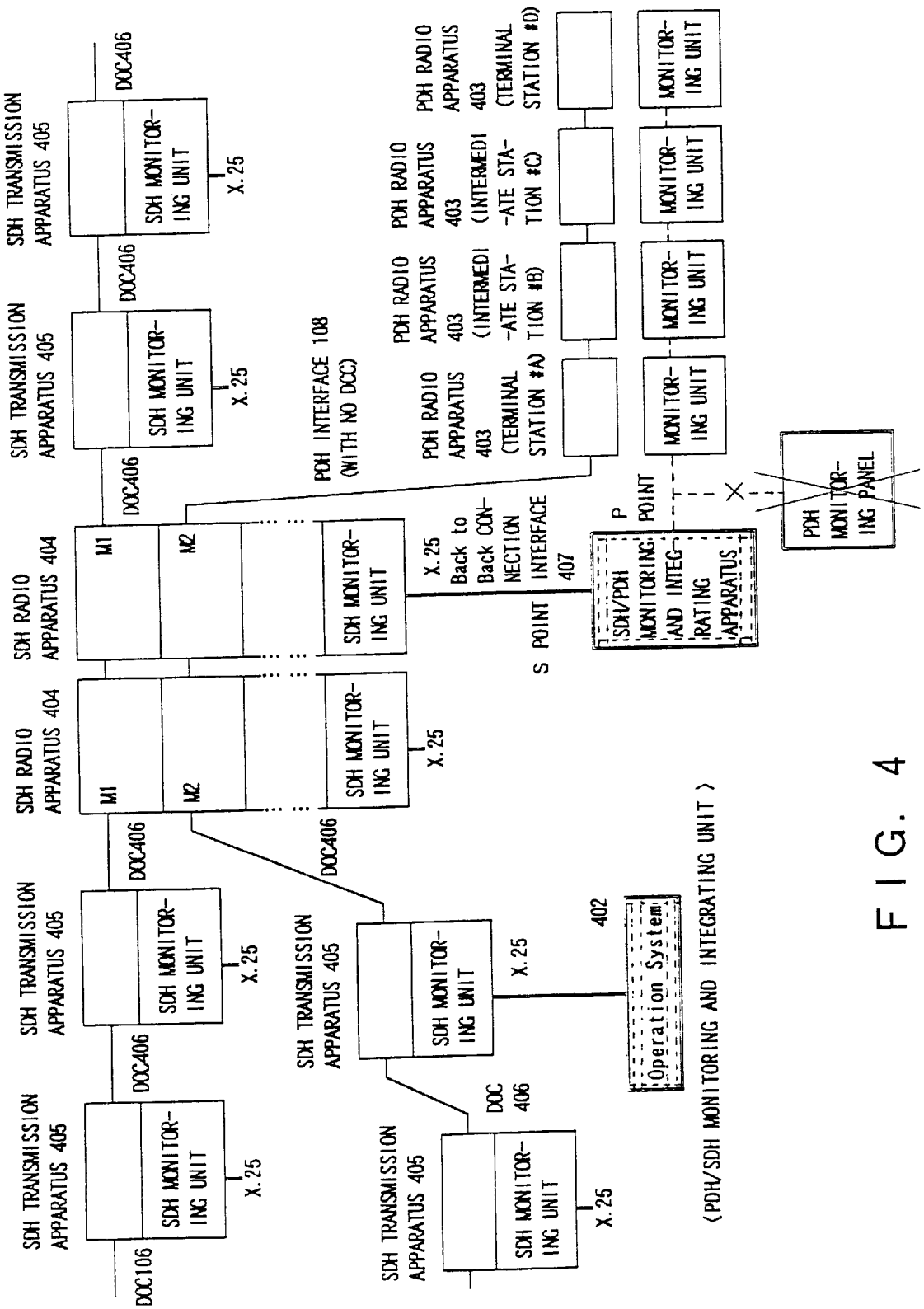
FIG. 4 is a first block diagram showing the configuration of an integrated communication network of the present invention which comprises SDH and already existing communication networks.
Figure 6:
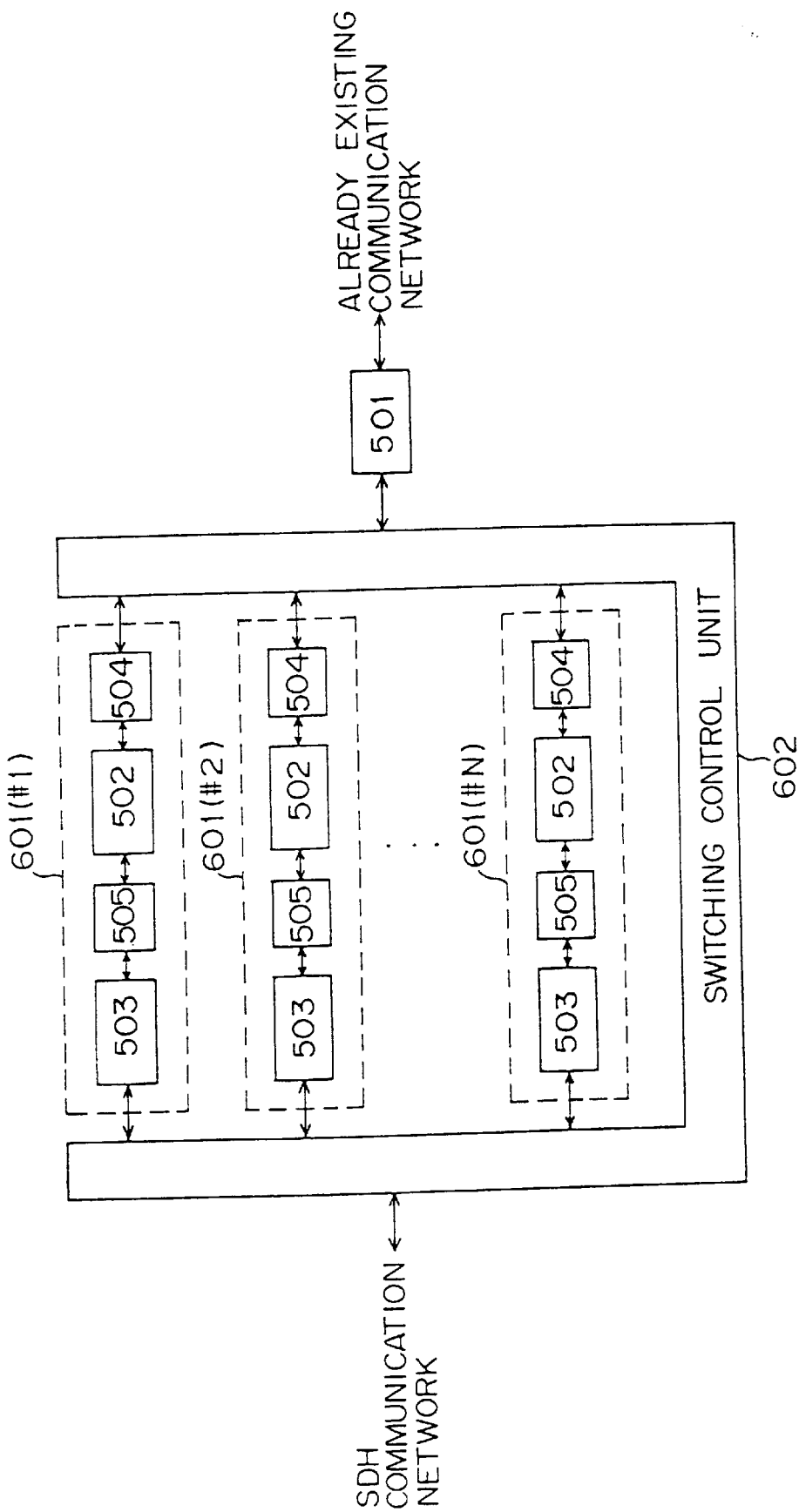
FIG. 6 is a third block diagram showing a second configuration of an SDH/PDH monitoring and integrating apparatus provided by the present invention in the integrated communication network shown in FIG. 4.

A PDH radio apparatus 703, a route-information preserving apparatus 704, an SDH radio apparatus 705, an SDH transmission apparatus 706, a main-signal channel 707, serial-data channels 708 and 709, a main-signal channel 710, a DCC 711 and a PDH interface unit 712 shown in FIG. 7 have functions identical with the PDH radio apparatus 101, the route-information preserving apparatus 108, the SDH radio apparatus 201, the SDH transmission apparatus 301, the main-signal channel 105, the serial-data channels 106 and 107, the main-signal channel 206, the DCC 207 and the PDH interface unit 302 respectively shown in FIGS. 1 to 3.

The PDH monitoring panel shown in FIGS. 1 and 3 is eliminated from the integrated communication network shown in FIG. 7. Instead, the integrated communication network shown in FIG. 7 is built into a configuration in which the monitored data collected from the PDH radio apparatuses 703 in the PDH communication network through the route-information preserving apparatus 704 is converted by an SDH/PDH monitoring and integrating apparatus 701 into data with a format that can be handled by an SDH monitoring system in the SDH communication network, and an operation system 702 in the SDH monitoring network integrates monitored data transmitted from the PDH communication network by way of the SDH/PDH monitoring and integrating apparatus 701 and the DCCs 711 as well as the X.25 networks in the SDH communication network with monitored data in the SDH communication network so that the monitored data can be processed.

The SDH/PDH monitoring and integrating apparatus 701 is linked to the PDH communication network using a point P interface, which connects the route-information preserving apparatus 704 and the conventional PDH monitoring panel of FIG. 1 which is eliminated from the integrated communication network shown in FIG. 7. On the other hand, the SDH/PDH monitoring and integrating apparatus 701 is linked to the SDH communication network through an X.25 back-to-back connection interface 713 employed in the SDH monitoring unit of an SDH radio apparatus 705 or an SDH transmission apparatus 706.

With new commands added to a TL1 language, an apparatus monitoring language used in the conventional SDH communication network, the SDH/PDH monitoring and integrating apparatus 701 is capable of processing the newly developed TL1 language, allowing monitored data in the PDH communication network processed by the conventional PDH monitoring panel 111 shown in FIG. 1 to be propagated through the SDH communication network.

A main characteristic of the present invention is the fact that the configuration of an integrated communication network comprising an existing PDH communication network already in operation and an already existing or newly installed SDH communication network in accordance with the present invention as described above allows the user to integrate a PDH monitoring system in an existing communication network with an SDH monitoring system without disconnecting the main signal.

Figure 8:
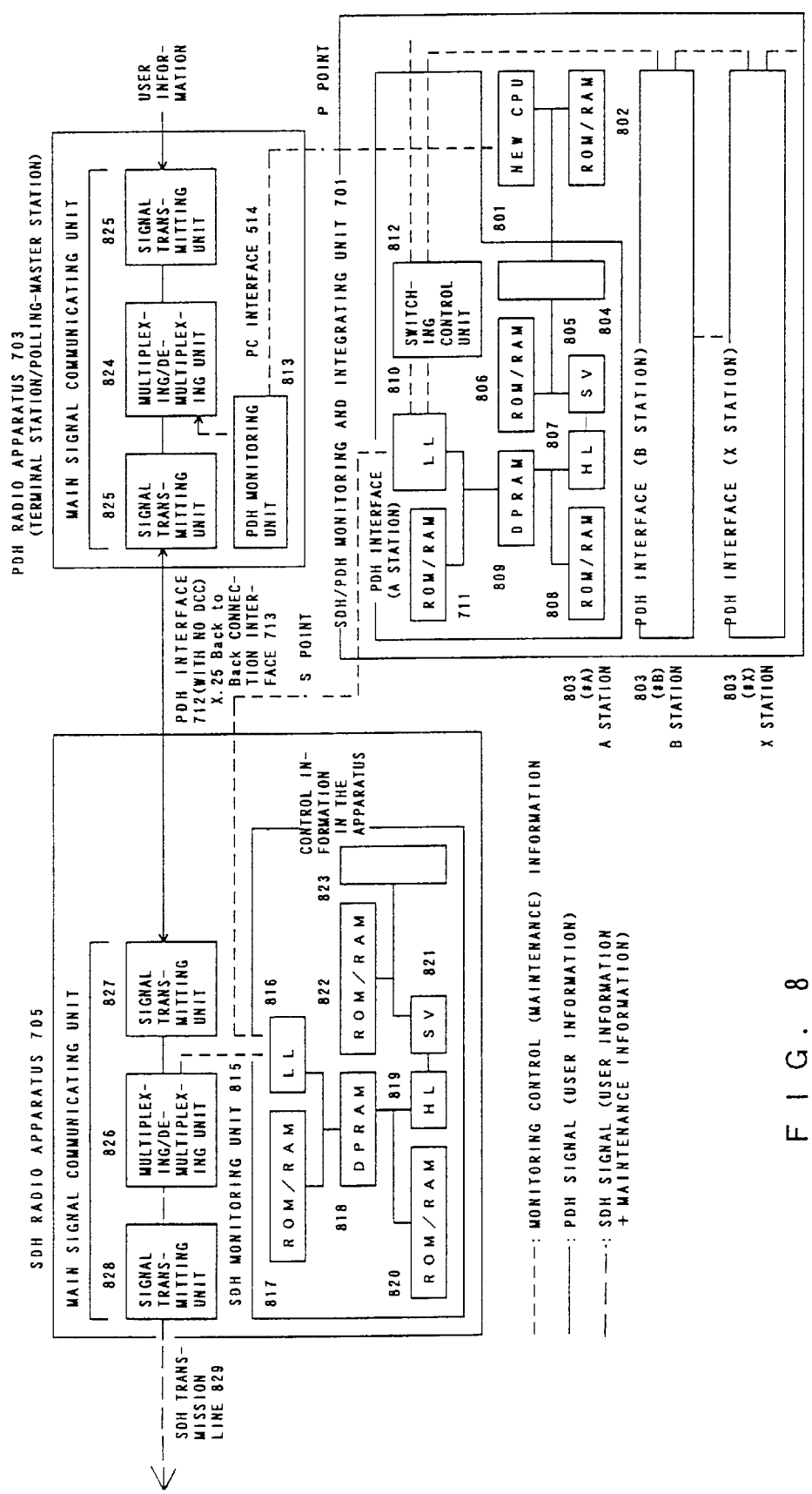
FIG. 8 is a circuit diagram showing an SDH/PDH monitoring and integrating apparatus.
Figures 9A, 9B:
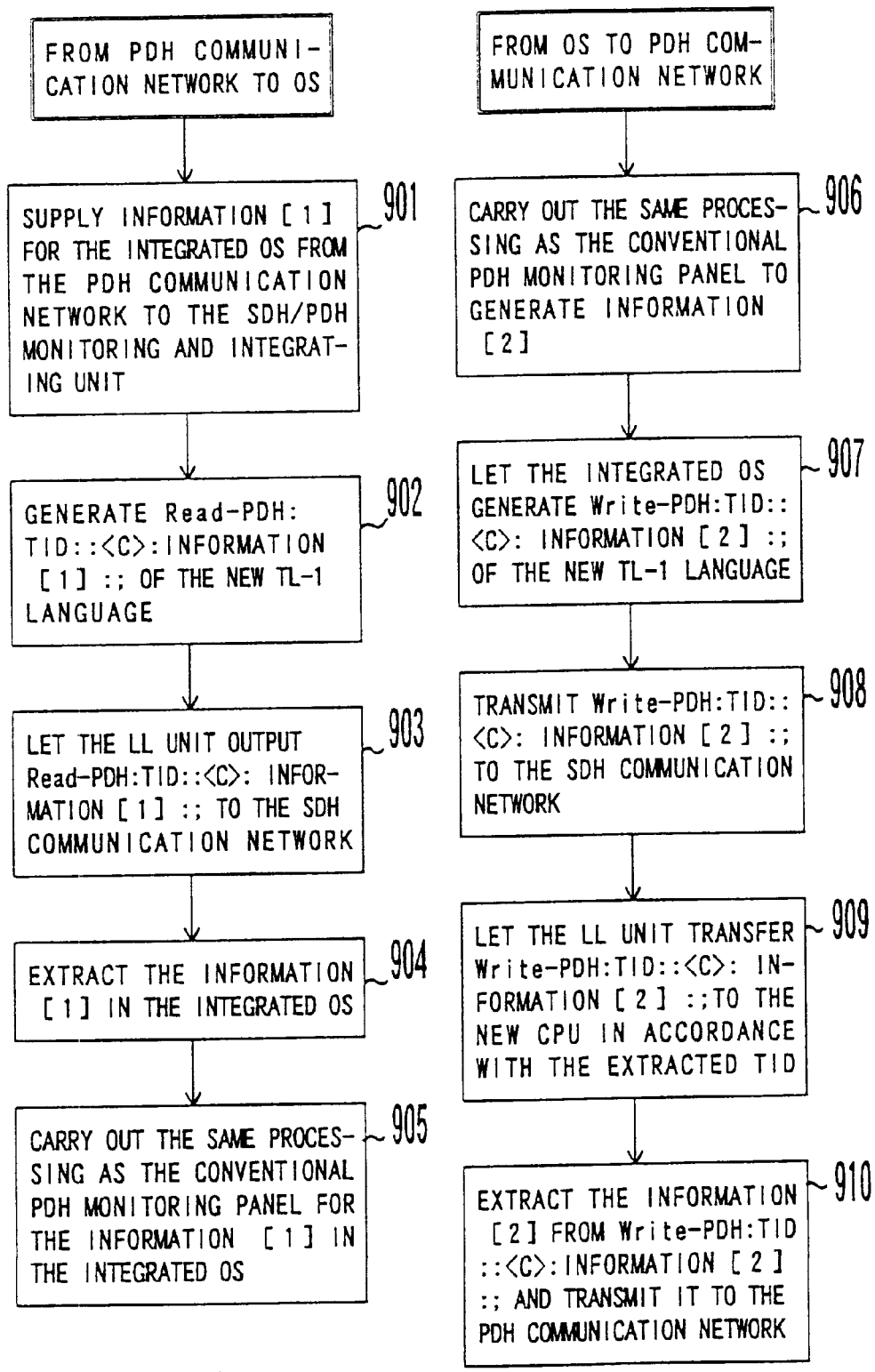
FIGS. 9A and 9B are diagrams each showing a flowchart of an overall operation carried out by the preferred embodiment.

FIG. 8 is a diagram showing the circuit configuration of the SDH/PDH monitoring and integrating apparatus 701 shown in FIG. 7 along with the circuit configurations of the PDH radio apparatus 703 and the SDH radio apparatus 705. FIGS. 9A and 9B are diagrams each showing a flowchart of monitoring control implemented by the circuit configurations.

As shown in FIG. 8, the SDH/PDH monitoring and integrating apparatus 701 comprises a NEW CPU 801, a ROM/RAM unit 802 and a plurality of PDH interface units 803. Each of the PDH interface units 803 processes monitored data for a PDH radio apparatus 703 in the PDH communication network.

As described by referring to FIG. 1, in the monitoring control of the conventional PDH communication network, the PDH monitoring panel 111 issues a request to the main CPU 109 employed in the route-information preserving apparatus 108 by way of the point P. The main CPU 109 retrieves monitored data from the memory unit 110 for storing monitored data for all the PDH radio apparatuses 101, sending a response to the request to the PDH monitoring panel 111.

In the present embodiment, monitored data of the PDH communication network can be collected by the operation system 702 in the SDH communication network shown in FIG. 7 without altering the monitoring method and the apparatus configuration in the PDH communication network. To put it in detail, first of all, the NEW CPU 801 employed in the PDH/SDH monitoring and integrating apparatus 701 collects monitored data appearing at the point P in conjunction with the ROM/RAM unit 802 at a step 901 of the flowchart shown in FIG. 9A. Then, the NEW CPU 801 stores the collected monitored data corresponding to each PDH radio apparatus 703 in a DPRAM unit 804 in a PDH interface unit 803 corresponding to each PDH radio apparatus 703.

The PDH interface unit 803 has a functional configuration similar to that of an SDH monitoring unit 815 employed in an SDH radio apparatus 705 or an SDH transmission apparatus 706 of the SDH communication network. It should be noted that both SDH radio apparatus 705 and the SDH transmission apparatus 706 are shown in FIG. 7. The PDH interface unit 803 comprises an SV unit 805, a ROM/RAM unit 806 used by the SV unit 805, an HL unit 807, a ROM/RAM unit 808 used by the HL unit 807, an LL unit 810, a ROM/RAM unit 811 used by the LL unit 810, a DPRAM unit 809 used for exchanging data between the HL and LL units 807 and 810 and the DPRAM unit 804 used for exchanging data between the SV unit 805 and the NEW CPU 801. By the same token, the SDH monitoring unit 815 employed in an SDH radio apparatus 705 comprises an SV unit 821, a ROM/RAM unit 822 used by the SV unit 821, an HL unit 819, a ROM/RAM unit 820 used by the HL unit 819, an LL unit 816, a ROM/RAM unit 817 used by the LL unit 816, a DPRAM unit 818 used for exchanging data between the HL and LL units 819 and 816 and an I/O unit 823 used for exchanging data between the SV unit 821 and a main-signal communicating unit employed in the SDH radio apparatus 705. The I/O unit 823 corresponds to the DPRAM unit 804. The PDH interface unit 803 is different from the SDH monitoring unit 815 in that the former has a switching control unit 812. The operation of the switching control unit 812 will be described later.

Having functional configurations similar to each other, circuit components employed in the SDH monitoring unit 815 of the SDH radio apparatus 705 can be used to build the PDH interface unit 803 of the SDH/PDH monitoring and integrating apparatus 701, allowing the SDH/PDH monitoring and integrating apparatus 701 to be provided at a low cost.

The SV unit 821 employed in the SDH monitoring unit 815 of the SDH radio apparatus 705 periodically fetches information on failures supplied in a bit-map format from a multiplexing/demultiplexing unit 826 or a signal transmitting unit 827 of the main-signal communicating unit of the SDH radio apparatus by way of the I/O unit 823. In order to allow the same component as the SV unit 821 to be used as the SV unit 805, the NEW CPU 801 stores monitored data collected at the point P in the DPRAM unit 804 in the same format as the bit-map format reported to the SV unit 821 by way of the I/O unit 823.

In conjunction with the ROM/RAM unit 806, the SV unit 805 employed in a PDH interface unit 803 collects monitored data for a PDH radio apparatus 703 associated with the PDH interface unit 803 from the DPRAM unit 804. To put it more concretely, the SV unit 805 periodically fetches information on failures reported through the DPRAM unit 804 in a bit-map format in order to detect a failure. The HL unit 807 is immediately notified of a detected failure, if any. In addition, the SV unit 805 periodically fetches and accumulates measured values of performance data reported through the DPRAM unit 804, periodically informing the HL unit 807 of the cumulative measurement value.

In conjunction with the ROM/RAM unit 808, the HL unit 807 employed in the PDH interface unit 803 transforms monitored data collected by the SV unit 805 into a predetermined monitoring language at a step 902 of the flowchart shown in FIG. 9A. In order to allow monitored data of the PDH communication network to be propagated through the SDH communication language, the HL unit 807 is capable of processing a new TL1 language, an extended version of a TL1 language. The TL1 language is an apparatus monitoring language used in the conventional SDH communication network.

New commands added to the TL1 language to provide the new TL1 language are described as follows:
1. A Read-PDH command transfers data in the direction from the PDH communication network to the SDH communication network.
2. A Write-PDH command transfers data in the direction from the SDH communication network to the PDH communication network.

A Read-PDH command is used when the HL unit 807 transforms monitored data collected by the SV unit 805 into the new TL1 language. The format of the Read-PDH command is described as follows:

Read-PDH:TID::<C>::information [1]::

where information [1] is monitored data collected by the SV unit 805 and TID is information specifying a route number of the whole PDH communication network connected at the point P.

In addition, in order to sustain the compatibility with the HL unit 819 employed in the SDH monitoring unit 815, the HL unit 807 is also capable of processing basic commands defined in the conventional TL-1 language. The basic commands are listed as follows:

| | |
|---|---|
| o SET-DAT | o ACT-USER |
| o SET-SID | o CANC-USER |
| o RTRV-HDR | o RTRV-SECU-UPC |
| o ED-SDCC | o ED-SECU-PID |
| o RTRV-SDCC | o ENT-SECU-USER |
| o INIT-SDCC | o ED-SECU-USER |
| o ED-SDCC | o DLT-SECU-USER |
| o RTRV-OSSI | o RTRV-SECU-USER |
| o INIT-SDCC | o REPT LOGOFF WARNING |
| o ED-X25 | o REPT AUTO LOGOFF |
| o RTRV-X25 | o REPT FORCED LOGOFF |
| o ED-VC | |
| o RTRV-VC | |

The HL unit 807 writes the Read-PDH command described above into the DPRAM unit 809.

Having the same hardware/firmware configuration as the LL unit 816 employed in the SDH monitoring unit 815, the LL unit 810 employed in the PDH interface 803 includes the Read-PDH command passed from the HL unit 807 through the DPRAM unit 809 in standardized protocol data in the SDH communication network. The protocol data is then output to the S point on the X.25 back-to-back connection interface 713 at a step 903 of the flowchart shown in FIG. 9A.

It should be noted that a local terminal can be connected to the LL unit 810 through an X.25 interface.

The protocol data described above is transferred to the multiplexing/demultiplexing unit 826 employed in the main-signal communicating unit of the SDH radio apparatus 705 by way of the LL unit 816 employed in the SDH monitoring unit 815 of the SDH radio apparatus 705. The protocol data is multiplexed on the DCC 711 of an SDH transmission line 829.

The Read-PDH command transmitted through the DCC 711 of the SDH transmission line 829 is then demultiplexed by the multiplexing/demultiplexing unit 826 employed in the main-signal communicating unit of the SDH radio apparatus 705 incorporating an X.25 network to which the operation system 702 is connected. The demultiplexed Read-PDH command is then transferred to the LL unit 816 employed in the SDH monitoring unit 815 of the SDH radio apparatus 705. The LL unit 816 then includes the Read-PDH command in protocol data of the X.25 network and outputs the protocol data to the X.25 network. The protocol data is finally received by the operation system 702 shown in FIG. 7.

Implemented typically by a workstation, the operation system 702 extracts the information [1] representing the monitored data of the PDH communication network from the Read-PDH command at a step 904 of the flowchart shown in FIG. 9A. The flow then goes on to a step 905 shown in FIG. 9A at which the same processing as that of the conventional PDH monitoring panel is carried out.

Next, operations during execution of control of a PDH radio apparatus 703 in the PDH communication network by the operation system 702 through the SDH communication network are explained by referring to the flowchart shown in FIG. 9B. The direction of such control is just opposite to the flow of monitored data from the PDH communication network to the operation system 702.

As shown in the figure, the flowchart begins with a step 906. At the step 906 of the flowchart shown in FIG. 9B, information [2] that can be processed by the PDH communication network is generated in the operation system 702 by the same processing as that of the conventional PDH monitoring panel.

Then, at the next step 907 shown in FIG. 9B, the operation system 702 generates a Write-PDH command including the information [2]. The format of the Write-PDH command is given as follows:

Write-PDH:TID::<C>::Information [2]::

where TID is information specifying a route number of the whole PDH communication network connected at the point P as is the case with the Read-PDH command described earlier.

The flow then goes on to a step 908 shown in FIG. 9B at which the operation system 702 includes the Write-PDH command in protocol data of the X.25 network, outputting the protocol data to the X.25 network. The Write-PDH command in the protocol data is received by the LL unit 816 employed in the SDH monitoring control unit 815 of an SDH radio apparatus 705 incorporating the X.25 network shown in FIG. 8 before being transferred to the multiplexing/demultiplexing unit 826 employed in the main-signal communicating unit of the SDH radio apparatus 705. The Write-PDH command is multiplexed on the DCC 711 of the SDH transmission line 829.

The Write-PDH command transmitted through the DCC 711 of the SDH transmission line 829 is then demultiplexed by the multiplexing/demultiplexing unit 826 employed in the main-signal communicating unit of the SDH radio apparatus 705 incorporating an X.25 to which the SDH/PDH monitoring and integrating apparatus 701 is connected. The demultiplexed Write-PDH command is then transferred to the LL unit 816 employed in the SDH monitoring unit 815 of the SDH radio apparatus 705. The LL unit 816 then includes the Write-PDH command in protocol data of the X.25 back-to-back connection interface 713 and outputs the protocol data to the interface 713. The protocol data is then received by the LL unit 810 employed in one of the PDH interface units 803 in the SDH/PDH monitoring and integrating apparatus 701 shown in FIG. 8.

Then, the LL unit 810 extracts the Write-PDH command from the protocol data, recognizing the TID specified in the command.

If the TID indicates that the Write-PDH command is destined for a PDH radio apparatus 703 to which the PDH interface unit 803 including the LL unit 810 is assigned, the LL unit 810 stores the command in the DPRAM unit 809.

If the TID indicates that the Write-PDH command is not destined for a PDH radio apparatus 703 to which the PDH interface unit 803 including the LL unit 810 is assigned, on the other hand, the command is transferred to another PDH interface unit 803 by way of the switching control unit 812. When the LL unit 810 employed in the other PDH interface unit 803 receives the Write-PDH command transferred thereto by way of the switching control unit 812, the LL unit 810 recognizes the TID specified in the command. If the TID indicates that the Write-PDH command is destined for a PDH radio apparatus 703 to which the PDH interface unit 803 including the LL unit 810 is assigned, the LL unit 810 stores the command in the DPRAM unit 809.

The Write-PDH command stored in the DPRAM unit 809 is decoded by the HL unit 807 before being transferred to the NEW CPU 801 by way of the SV unit 805 and the DPRAM unit 804 at a step 909 of the flowchart shown in FIG. 9B.

The flow then goes on to a step 910 shown in FIG. 9B at which the NEW CPU 801 fetches the information [2] from the Write-PDH command stored in the DPRAM unit 804, maps the information [2] onto a data format that can be recognized in the PDH communication circuit and outputs control data resulting from the mapping to the point P on the PDH communication network.

The control data is transmitted to the addressed PDH radio apparatus 703 by way of a PC interface 814 by using a polling technique and received by the PDH monitoring unit 813 employed in the PDH radio apparatus 703. The PDH monitoring unit 813 controls components employed in the main-signal communicating unit such as the multiplexing/demultiplexing unit 824 or the signal transmitting unit 825 in accordance with the control data transmitted thereto.

Figure 10:
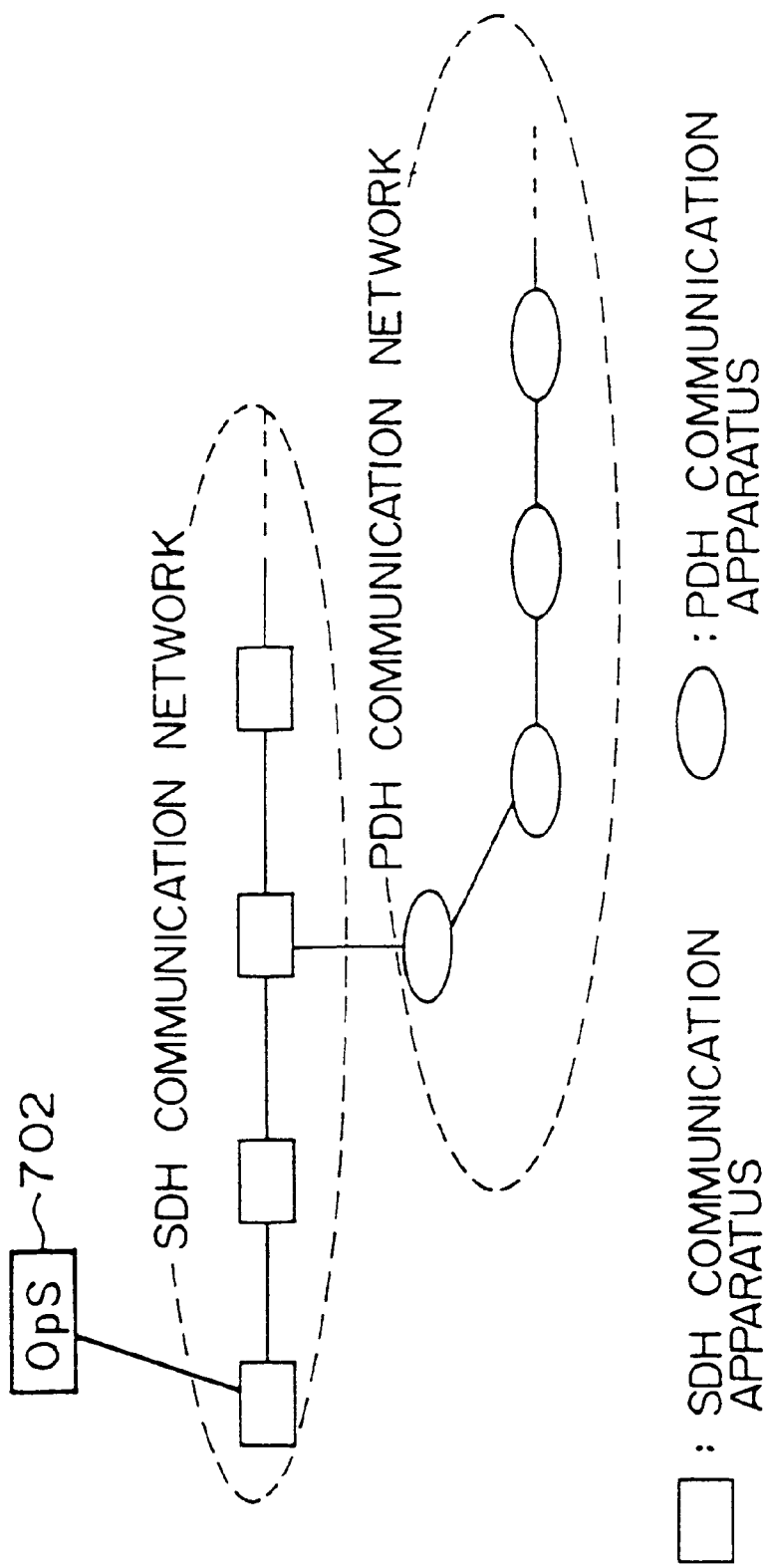
FIG. 10 is an explanatory diagram showing operational functions.

According to the control operations described above, the operation system 702 in the SDH communication network is capable of integrating the monitoring control of the SDH communication network and the monitoring control of the PDH communication network as shown in FIG. 10. The present invention is characterized in that, in this case, it is not necessary to modify the monitoring system of the existing PDH communication network and the monitoring system of the existing SDH communication network.

Operations in the Event of a Failure Occurrina in the PDH Communication Network

It is possible to build an SDH/PDH monitoring and integrating apparatus 701 into a configuration wherein one PDH interface unit 803 is capable of processing monitored data for all PDH radio apparatuses 703 in the PDH communication network. Such a configuration is also included in the scope of the present invention as well. By providing a plurality of PDH interface units 803 each associated with a PDH radio apparatus 703 as shown in FIG. 8, however, there is resulted in an effect that, in the event of a channel failure occurring in the PDH communication network, it is possible to easily detach a portion in which the failure has occurred as will be described below.

The following is description of an operation carried out by a switching control unit 812 employed in the PDH interface unit 803 of the SDH/PDH monitoring and integrating apparatus 701 in order to implement this effect.

The switching control unit 812 is provided to implement the following two functions. The first function is to make the state of connection of the main-signal channel 707 for transmitting main signals on the PDH communication network match the states of connection of the serial-data channels 708 and 709 for transmitting monitored data thereon. The second function is to make the operating state of the PDH monitoring unit 813 employed in each PDH radio apparatus 703 match the operating state of the PDH interface unit 803 provided for the PDH radio apparatus 703.

First of all, the first function implemented by the switching control unit 812 is explained by referring to FIG. 11.

In this first function, in order to make the state of connection of the main-signal channel 707 for transmitting main signals on the PDH communication network match the states of connection of the serial-data channels 708 and 709 for transmitting monitored data, in the event of a channel failure occurring on the main-signal channel 707 in the PDH communication network, the switching control unit 812 disconnects the serial-data channels for transmitting monitored data among a plurality of PDH interface units 803.

Here, in the case of a PDH communication network comprising a terminal station #A serving as a polling-master station, an intermediate station #B serving as a polling-slave station, an intermediate station #C also serving as a polling-slave station and a terminal station #D also serving as a polling-slave station wherein the stations are each implemented by a PDH radio apparatus 703 and are all connected in cascade, for example, assume that a channel failure occurs between the intermediate stations #B and #C, making it no longer possible to carry out polling from the terminal station #A to the intermediate station #C and the terminal station #D.

If the switching control unit 812 employed in each of the PDH interface units 803 in an SDH/PDH monitoring and integrating apparatus 701 shown in FIG. 11 does not execute any control action, however, the two #C and #D PDH interface units 803 associated with the intermediate station #C and the terminal station #D respectively will appear to be in a state of being capable of receiving monitored data, giving rise to confusion due to an inability to distinguish a truly normal state from a really abnormal state caused by the occurrence of a failure.

In order to avoid such confusion, in the case of the present preferred embodiment, in the event of a failure, the switching control unit 812 employed in a PDH interface unit 803 provided for a PDH radio apparatus 703 affected by the failure disconnects its serial-data channels for transmitting monitored data. To put it concretely, in the SDH/PDH monitoring and integrating apparatus 701 shown in FIG. 11, the NEW CPU 801 issues an instruction to the switching control unit 812 employed in the #B PDH interface unit 803 to disconnect the serial-data channels for transmitting monitored data between the #B and #C PDH interface units 803. At the same time, the NEW CPU 801 issues an instruction to the switching control unit 812 employed in the #C PDH interface unit 803 to disconnect the serial-data channels for transmitting monitored data between the #C and #D PDH interface units 803. With the serial-data channels disconnected as described above, the #C and #D PDH interface units 803 are no longer capable of processing monitored data. As a result, it is possible to make the state of connection of the main-signal channel on the PDH communication network match the states of connection of the serial-data channels 708 and 709 for transmitting monitored data and, hence, to distinguish the state in which each PDH interface unit is capable of receiving monitored data from an abnormal state caused by the occurrence of an actual channel failure.

Figure 12:
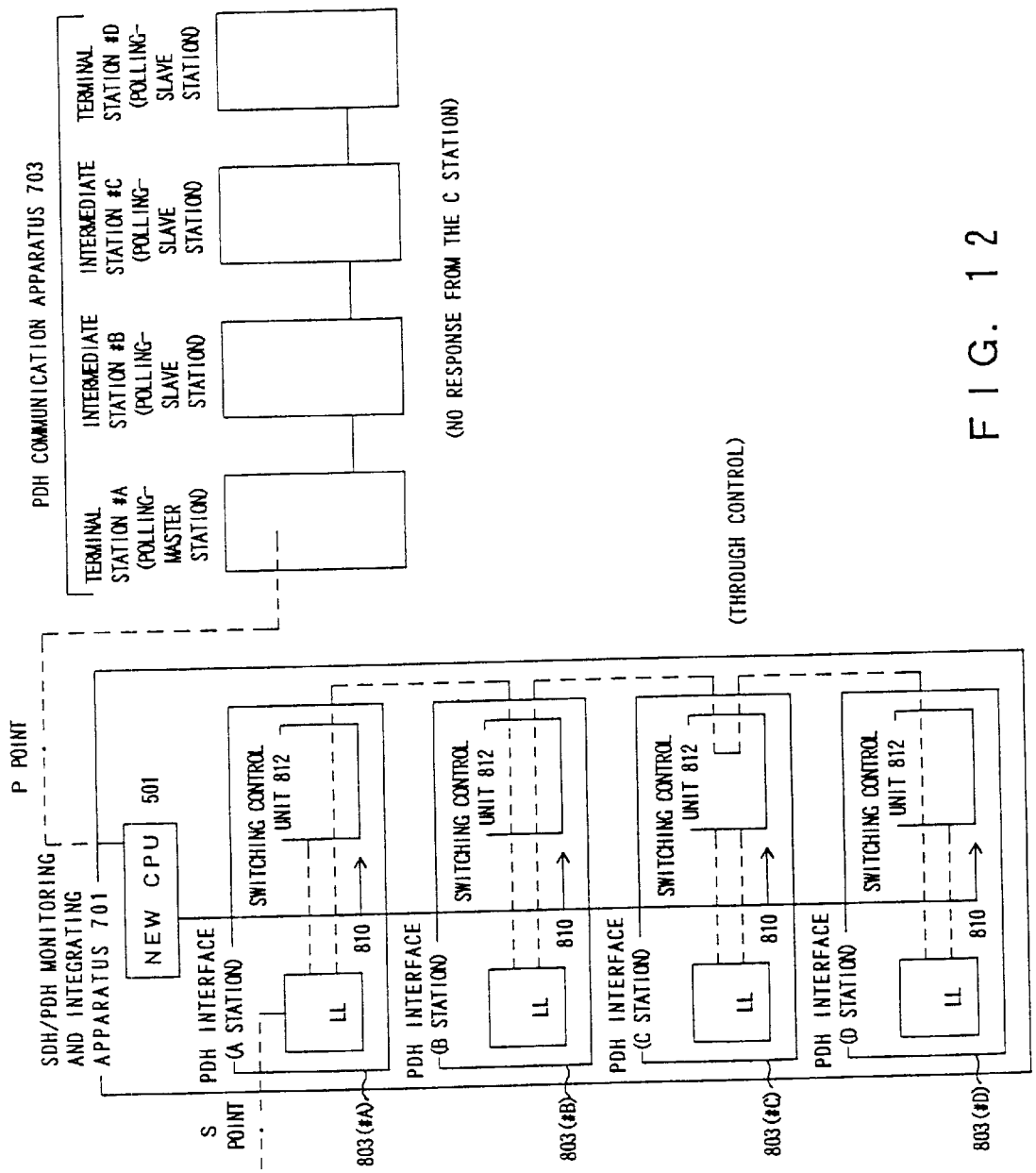
FIG. 12 is an explanatory diagram showing control in a state with no monitoring control response.

Next, the second function implemented by the switching control unit 812 is explained by referring to FIG. 12.

In the second function, in order to make the operating state of the PDH monitoring unit 813 employed in each PDH radio apparatus 703 match the operating state of the PDH interface unit 803 provided for the PDH radio apparatus 703, the switching control unit 812 detaches a PDH interface unit 803 in accordance with the polling responding state of the PDH interface unit 803.

Here, in the case of a PDH communication network shown in FIG. 12 with the same configuration as that shown in FIG. 11, for example, assume that a failure occurs in the PDH monitoring unit 813 of the intermediate station #C so that only the intermediate station #C does not respond to a polling made by the terminal station #A. For details of the PDH monitoring unit 813, refer to FIG. 8.

If the switching control unit 812 employed in each of the PDH interface units 803 in an SDH/PDH monitoring and integrating apparatus 701 shown in FIG. 12 does not execute any control action, however, the #C PDH interface units 803 associated with the intermediate station #C appears to be in a state of being capable of receiving monitored data, giving rise to confusion due to an inability to distinguish a truly normal state from a really abnormal state caused by the occurrence of a failure.

In order to avoid such confusion, in the case of the present preferred embodiment, in the event of a failure, the switching control unit 812 employed in a PDH interface unit 803 provided for a PDH radio apparatus 703 executes a control action in dependence on the polling responding state of the PDH radio apparatus 703. To put it concretely, the switching control unit 812 employed in a PDH interface unit 803 provided for a PDH radio apparatus 703 that does not respond to a polling made by the terminal station #A disconnects the PDH interface unit 803 from the serial-data channel for transmitting monitored data, putting the channel in a through state. With the serial-data channel disconnected as described above, the #C PDH interface unit 803 is no longer capable of processing monitored data. As a result, it is possible to make the monitored-data receiving state of a PDH interface unit 803 match the polling responding state of the PDH radio apparatus 703 associated with the PDH interface unit 803 and, hence, to distinguish the state in which the PDH interface unit 803 is capable of receiving monitored data from an abnormal state caused by the occurrence of an actual failure occurring in the PDH radio apparatus 703.

Control of Time Synchronization for Performance Data

In the section with the title "Description of the Conventional PDH Monitoring System," time accuracy is required in the measurement of performance data. A PDH radio apparatus 703 in a PDH communication network is provided with a mechanism for synchronizing time with other PDH radio apparatuses as instructed by a command issued by a polling-master station.

Here, with a monitoring system on a PDH communication network integrated with a monitoring system on an SDH communication network, it becomes necessary to synchronize time between the two systems.

In the present preferred embodiment, as a mechanism for synchronizing time between the PDH and SDH monitoring systems, control described below is executed.

FIG. 13 is an explanatory diagram showing a sequence of operations carried out by the NEW CPU for resetting time. As shown in the figure, the time of a PDH radio apparatus 703 of a PDH communication network is synchronized with a time Tp by the NEW CPU 801 employed in an SDH/PDH monitoring and integrating apparatus 701. The PDH radio apparatus 703 and the NEW CPU 801 are shown in FIGS. 7 and 8 respectively. On the other hand, SDH radio apparatuses 705 and SDH transmission apparatuses 706 composing an SDH communication network as shown in FIG. 7 are controlled to a state of being synchronized with a clock reference all the time. As a result, the SDH radio apparatuses 705 and the SDH transmission apparatuses 706 are synchronized with a time Ts for example.

The NEW CPU 801 employed in the SDH/PDH monitoring and integrating apparatus 701 outputs RTRV-DAT, a TL1 command requesting time information, to the HL unit 819 employed in the SDH monitoring unit 815 of the SDH radio apparatus 705 by way of the DPRAM unit 804, the SV unit 805, the HL unit 807, the DPRAM unit 809, the LL unit 810 and the X.25 back-to-back connection interface 713.

In response to the RTRV-DAT command, the HL unit 819 sends the requested time information to the NEW CPU 801. The NEW CPU 801 then transmits an instruction to reset time to all PDH radio apparatuses 703 composing the PDH communication network by using a polling technique in accordance with the time information received from the HL unit 819. As a result, the time of each of the PDH radio apparatuses 703 is synchronized with the same time as the Ts for the SDH communication network.

Even if a slippage in time between the SDH and PDH communication networks occurs thereafter, the times of the two networks can be synchronized with each other periodically in a sequence shown in FIG. 13.

Figure 14:
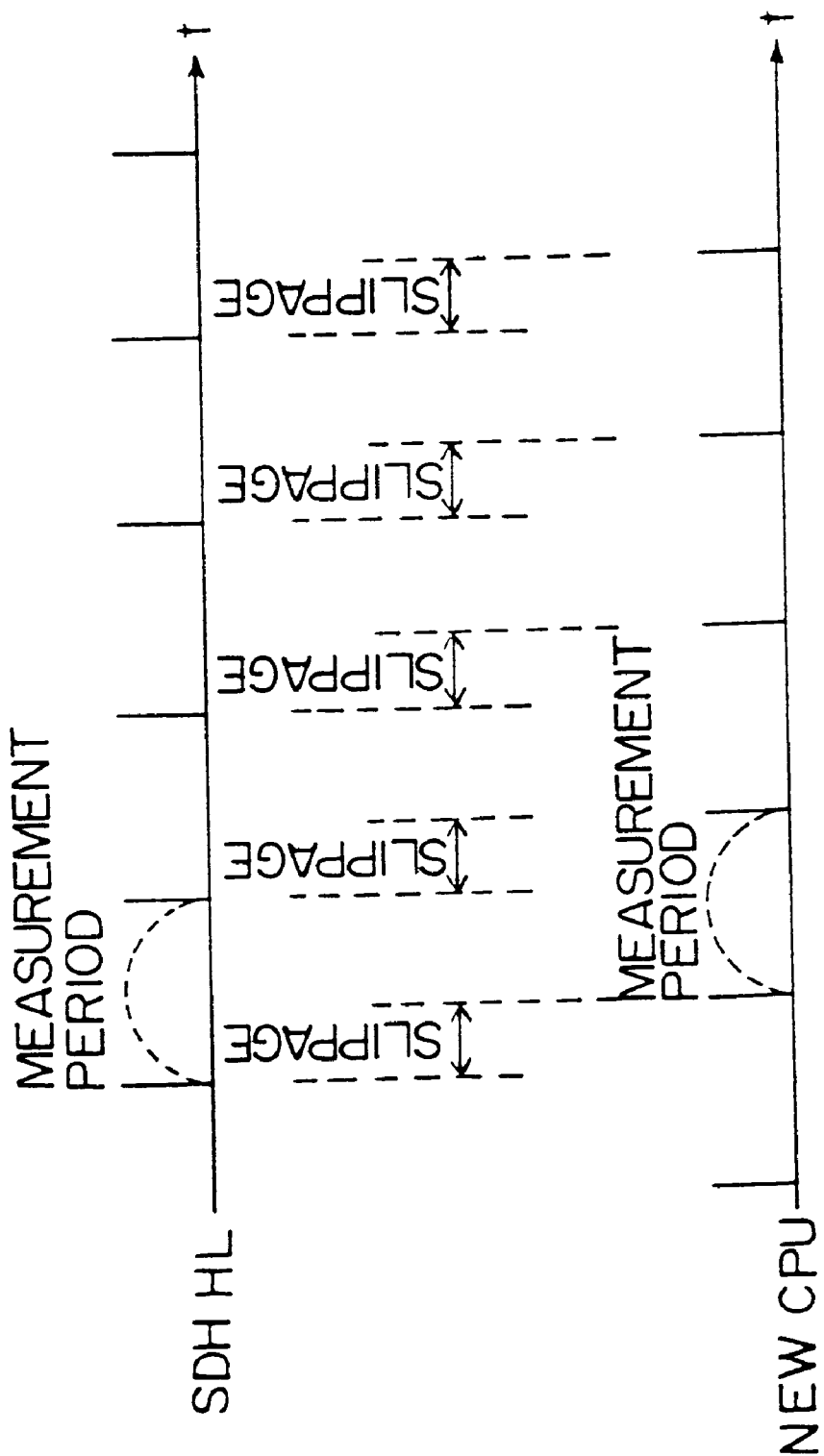
FIG. 14 is an explanatory diagram showing a state in which there is a discrepancy between the start and/or the end of a measurement of performance data carried out in an SDH communication network and the start and/or the end of a measurement of performance data carried out in a PDH communication network employed in the conventional SDH/PDH integrated communication network.
Figure 15:
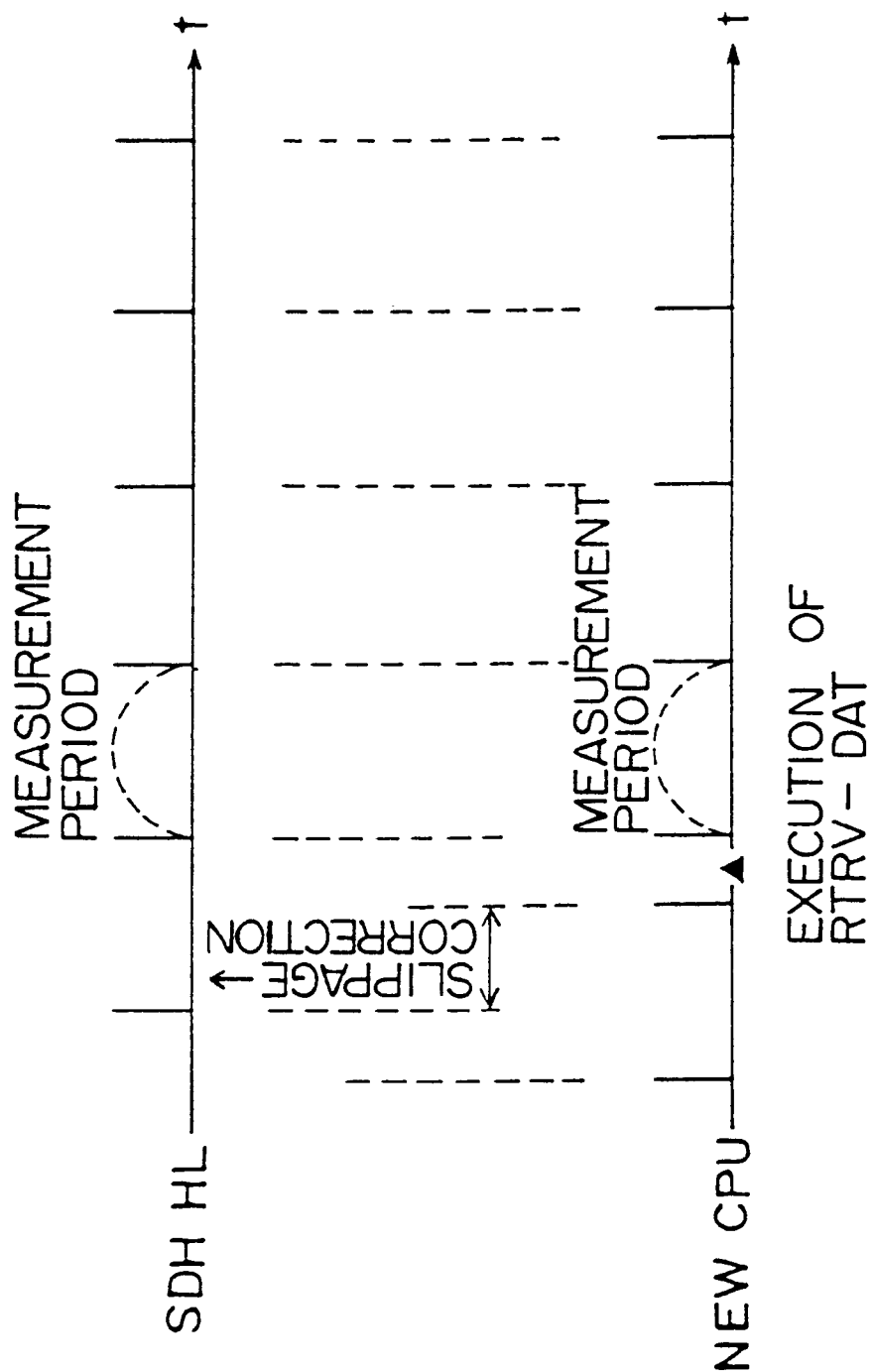
FIG. 15 is an explanatory diagram showing a state in which the start and/or the end of a measurement of performance data carried out in an SDH communication network match the start and/or the end of a measurement of performance data carried out in a PDH communication network.

If the control to synchronize the time described above is not executed, there will be resulted in a discrepancy between the start and/or the end of a measurement of performance data carried out by the HL unit 819 in the SDH communication network and the start and/or the end of a measurement of performance data carried out by the NEW CPU 801 in the PDH communication network as shown in FIG. 14. If the control to synchronize the time described above is executed as is the case with the present embodiment, on the other hand, it is possible to make the start and/or the end of a measurement of performance data carried out by the HL unit 819 in the SDH communication network coincide with the start and/or the end of a measurement of performance data carried out by the NEW CPU 801 in the PDH communication network respectively as shown in FIG. 15.

Processing to Inform Performance Data in the SDH/PDH Monitoring and Integrating Apparatus 701

Figure 16:
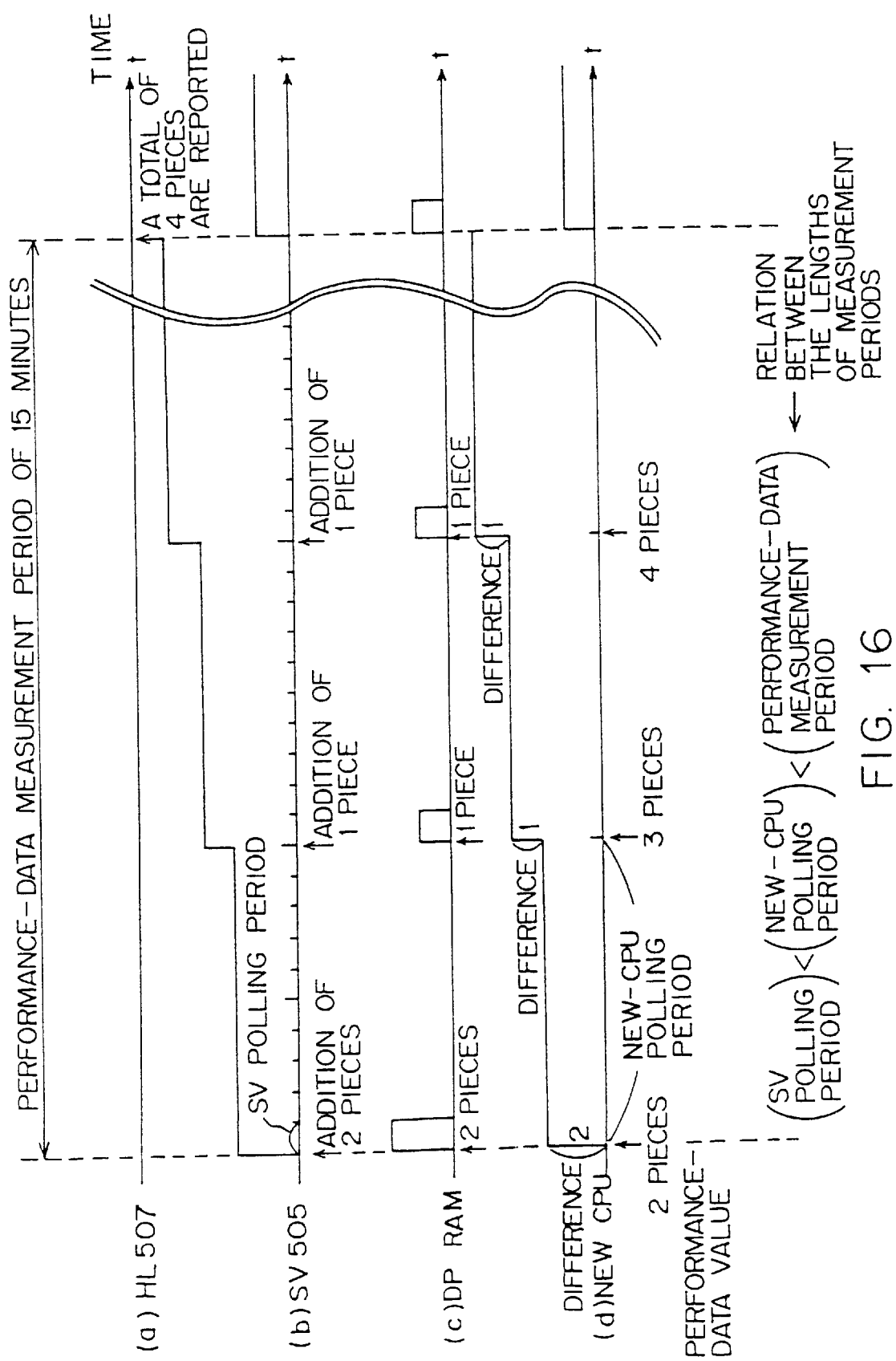
FIG. 16 is an explanatory diagram showing processing to report performance data.

The following is detailed description of processing to report performance data in the SDH/PDH monitoring and integrating apparatus 701 with reference to FIG. 16, an explanatory diagram showing processing to report performance data.

As shown in the figure, the NEW CPU 801 employed in the SDH/PDH monitoring and integrating unit 701 shown in FIG. 8 collects measured values of performance data of PDH radio apparatuses 703 on the PDH communication network by using a polling technique periodically, typically every ten seconds, the polling period of the NEW CPU 801.

The collected measured values of the performance data include pieces of history performance data obtained for each performance-data measurement period of typically 15 minutes and current performance data obtained from the current measurement.

The current performance data and each piece of history performance data each have a time stamp added thereto by the PDH radio apparatus 703. In this case, the time of the PDH communication network is synchronized with the time of the SDH communication network as described earlier.

As shown by time charts of FIGS. 16D and 16C, the NEW CPU 801 employed in the SDH/PDH monitoring and integrating apparatus 701 holds the previous and the present values of the collected current performance data, calculating the difference between them. The difference is then stored in the DPRAM unit 804 of the PDH interface unit 803 provided for a PDH radio apparatus 703 which has output the performance data. The DPRAM unit 804 of the PDH interface unit 803 is shown in FIG. 8. Each time a difference is calculated by the NEW CPU 801, the difference is reported to the SV unit 805.

As shown by a time chart of FIG. 16B, on the other hand, the SV unit 805 reads out the difference from the DPRAM unit 804 periodically, typically once a second, the polling period of the SV unit, sequentially adding up the difference in a cumulative manner. After reading out the difference, the SV unit 805 interrupts the NEW CPU 801, requesting the NEW CPU 801 to clear the difference stored in the DPRAM unit 804. In accordance with the interrupting request made by the SV unit 805, the NEW CPU 801 clears the difference stored in the DPRAM unit 804. Such a request for an interrupt to clear the difference is made for each item of the collected performance data.

The SV unit 805 informs the HL unit 807 of the cumulative value of differences of performance data periodically, typically once a minute, and then clears the cumulative value to a zero after being reported to the HL unit 807.

As shown by a time chart of FIG. 16A, the HL unit 807 further cumulatively adds the cumulative values of the performance data received from the SV unit 805, summarizing the result for each performance-data measurement period or typically 15 minutes in order to create current performance data. Pieces of current performance data obtained for a plurality of performance-data measurement periods constitute pieces of history performance data cited earlier. The HV unit 807 then informs the operation system 702 in the SDH communication network of the current performance data and the pieces of history performance data by using a predetermined TL1 command.

Correction Around a Boundary of a Performance-Data Measurement Period

The following is description of processing to correct performance data carried out by the NEW CPU 801 around a boundary of a period or a measurement of performance data.

In each PDH radio apparatus 703 in a PDH communication network, the value of performance data is cleared by the NEW CPU 801 employed in the SDH/PDH monitoring and integrating apparatus 701 for each performance-data measurement period. Thus, in the present preferred embodiment, a processing to correct performance data around a boundary of a performance-data measurement period is carried out as follows.

Figure 17:
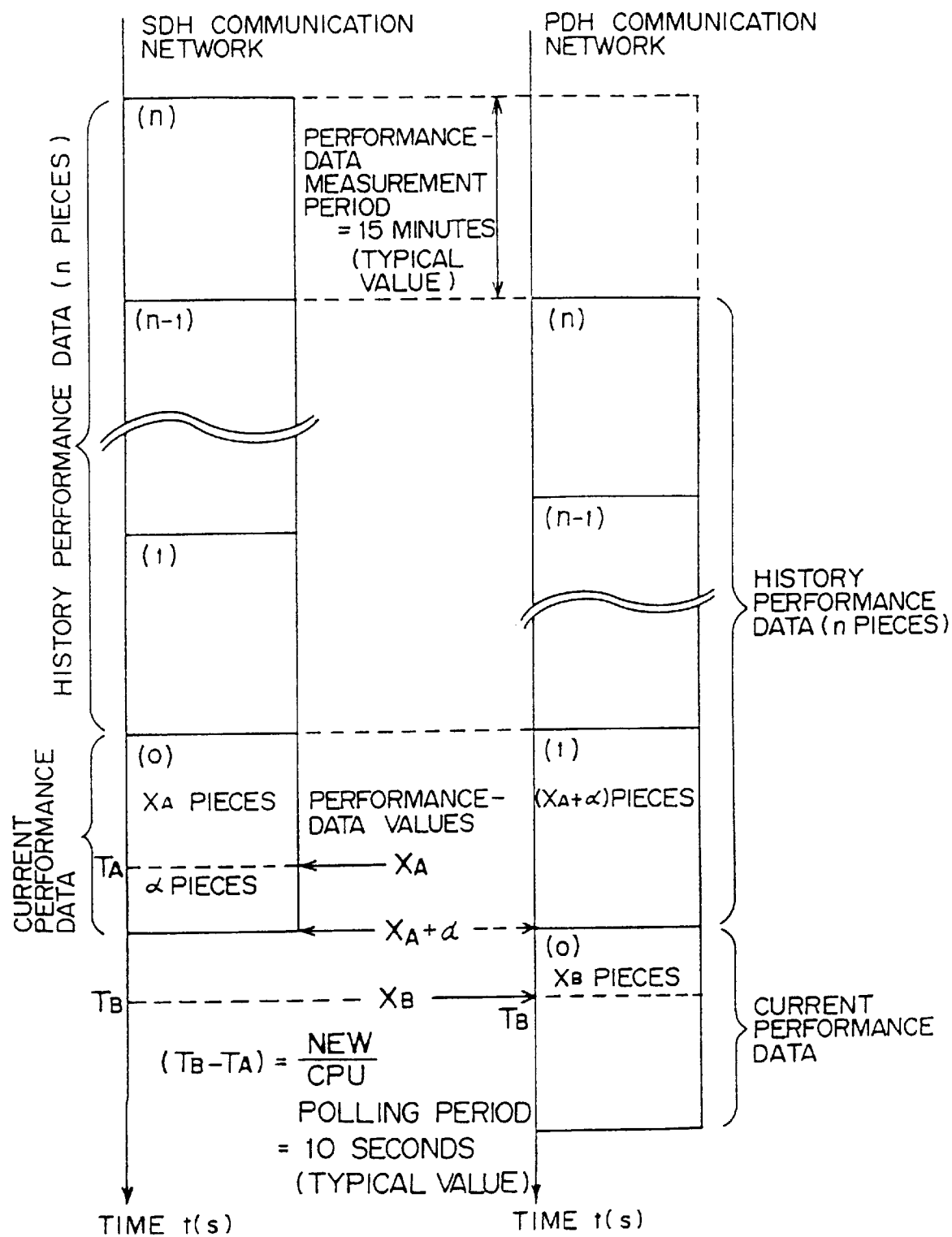
FIG. 17 is an explanatory diagram showing processing to carry out correction around a boundary point of time between periods of measurement of performance data.

FIG. 17 is a diagram showing a plan of a process to correct performance data for a case in which the polling period, typically having a length of 10 seconds, of the NEW CPU 801 to collect performance data coincides with a boundary of the performance-data measurement period with a typical length of 15 minutes.

Assume that, in a periodical polling carried out by the NEW CPU 801, the number of performance-data values at a time TA is XA and timing with which as many as α pieces of performance data are generated thereafter coincides with a boundary of a performance-data measurement period. Then, at a time TB after the timing in the next periodical polling carried out by the NEW CPU 801, the number of performance-data values is XB.

Normally, the NEW CPU 801 informs the SV unit 805 of the difference (XB−XA) between the periodical pollings. With the polling period of the NEW CPU 801 coinciding with the boundary of a performance-data measurement period as described above, however, processing to correct performance data based on the following formula is carried out.

The number of performance-data values reported to the SV unit 805 this time is:

$$(XA+\alpha)-XA+XB=(XB+\alpha)$$

where (XA+α) is the number of performance-data values obtained in the previous performance-data measurement period, XA is the number of performance-data values obtained in the previous polling and XB is the number of performance-data values obtained in the current polling.

By executing the correction described above, it is possible to eliminate the loss of performance-data values caused by the periodical polling period of NEW CPU 801, that is the a performance-data values shown in FIG. 17.

Format of Monitored Data

FIGS. 18A and 18B are diagrams showing formats of data in the SDH and PDH communication networks respectively.

As shown in FIG. 18A, data communicated in an SDH communication network comprises a pay load #3 having a transmission rate of about 155 Mbps (megabits per second), a radio-peculiar RFCOH overhead channel #1 for transmitting the channel switching signal and other signals and an SOH system overhead channel #2 for transmitting monitored data. It should be noted that the pay load #3 corresponds to the main-signal channel 710 shown in FIG. 7. The data format is standardized in accordance with recommendations made by the ITU-T and others, allowing main signals and control data such as monitored data to be exchanged among apparatuses and transmission lines supplied by different vendors and among transmission lines implemented by different communication media. Monitored data in the SDH communication network is transmitted by using the SOH system overhead channel #2.

On the other hand, an example of the data format of data communicated in an PDH communication network is shown in FIG. 18B. As shown in the figure, the data format comprises a pay load #4 having a transmission rate of about 170 Mbps and a radio-peculiar RFCOH overhead channel

1. It should be noted that the pay load #4 corresponds to the main-signal channel 707 shown in FIG. 7. However, the data format varies from vendor to vendor and from communication medium to communication medium. Monitored data in the PDH communication network is transmitted by using the radio-peculiar RFCOH overhead channel #1.

FIG. 19 is an explanatory diagram showing transformation from PDH data into SDH data and vice versa which is carried out by the SDH/PDH monitoring and integrating apparatus 701. To put it in detail, FIG. 19 is a diagram used for explaining the concept of processing to carry out transformation from monitored data on the RFCOH overhead channel #1 of data communicated in the PDH communication network into monitored data on the SOH system overhead channel #2 of data communicated in the SDH communication network and vice versa.

Monitored data processed by a PDH radio apparatus 703 is inserted or extracted to or from the RFCOH overhead channel #1 of data communicated in the PDH network in a format of bit-map information 1901.

On the other hand, monitored data processed by an SDH radio apparatus 705, an SDH transmission apparatus 706 and the operation system 702 is inserted or extracted to or from the SOH system overhead channel #2 of data communicated in the SDH network in a format of the new TL1 language 1902 described earlier. As described above, the SDH/PDH monitoring and integrating apparatus 701 executes processing to transform monitored data having the format of bit-map information 1901 to that having the format of the new TL1 language 1902 and vice versa.

FIG. 20 is a diagram showing the data format of an alarm in a PDH communication network, a kind of monitored data transmitted in the RFCOH overhead channel #1 of data communicated in the PDH network.

An alarm is stored in an eight-byte information field I of frame data which comprises a flag F, an address A, a control code C, the information field I and the frame check sequence FCS as shown in the figure.

As shown in FIG. 20, an alarm is stored in the information field I which comprises an eight-byte message header and an eight-byte fixed-length data field. The message header is composed of a one-byte data-length field, a one-byte maker-ID field, a one-byte apparatus-type field, a one-byte first spare field, a one-byte second spare field, a one-byte data-ID field and a two-byte data field. The data-length field indicates the total number of bytes composing the message header and the fixed-length data field. The maker-ID field indicates the manufacturer of a digital micro radio apparatus which is used as a PDH radio apparatus 703. The apparatus-type-code field indicates the type of the digital micro radio apparatus. The ID-data field indicates the type of monitored data, that is, either an alarm or a measured value of performance data. The message-ID type represents the power-supply voltage, the reception system, the transmission capacity and the frequency band of the PDH radio apparatus 703 as shown in FIG. 21.

Bits 1 to 64 of the fixed-length data type shown in FIG. 20 each correspond to an alarm of the PDH radio apparatus 703 listed in a table shown in FIGS. 22 and 23. A value of 0 in a bit indicates an unset alarm. On the other hand, a value of 1 in a bit indicates a set alarm.

Figure 24:
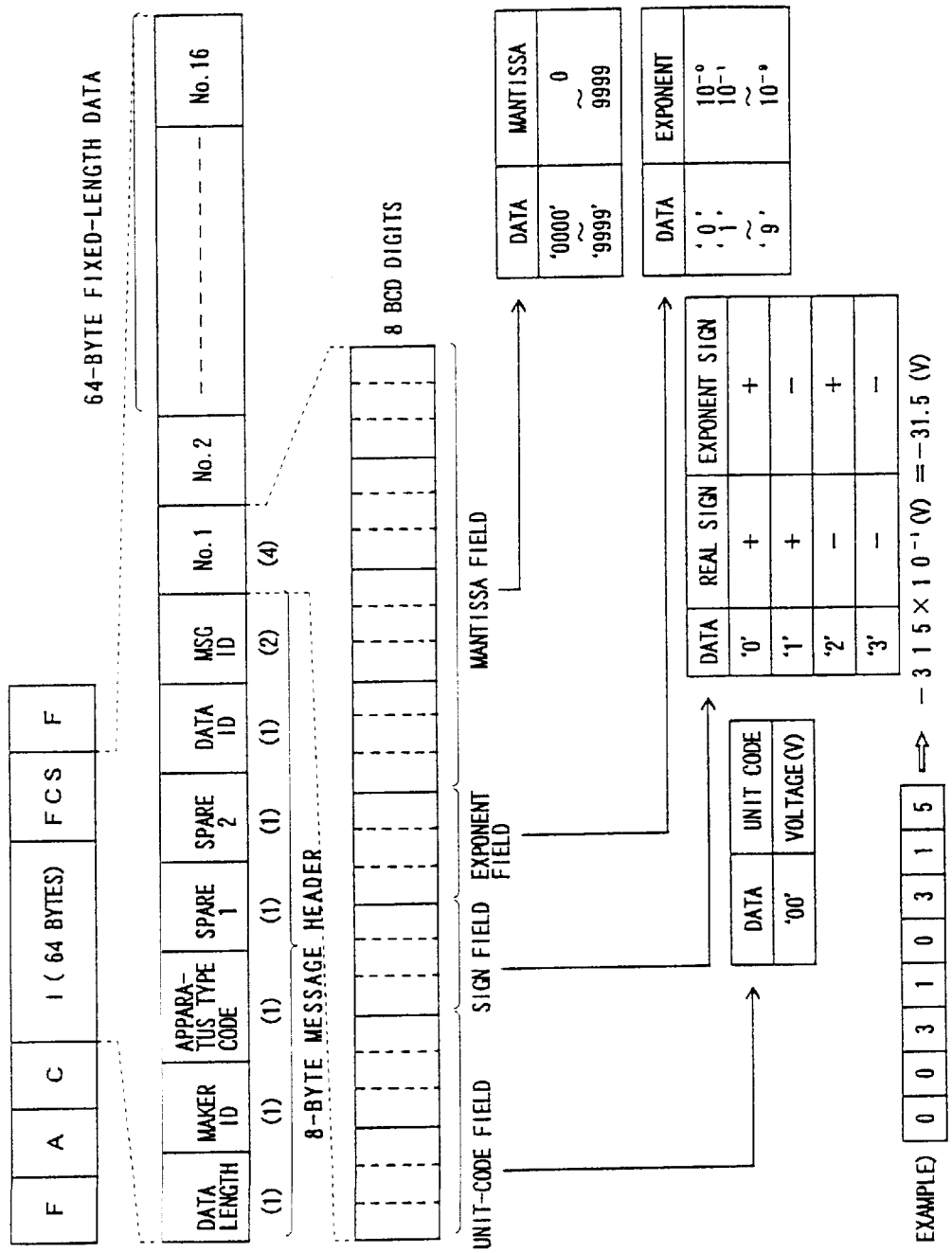
FIG. 24 is a diagram showing the data format of a measured value in a PDH communication network.

FIG. 24 is a diagram showing the data format of a measured value of performance data, another kind of measured data transmitted in the RFCOH overhead channel #1 of data communicated in a PDH communication network.

As shown in FIG. 24, a measured value is stored in a 64-byte information field I of frame data which comprises a flag F, an address A, a control code C, the information field I and the frame check sequence FCS.

Much like an alarm shown in FIG. 20, a measured value stored in the information field I comprises an eight-byte message header and a 64-byte fixed-length data field.

The 64-byte fixed-length data field shown in FIG. 24 is divided into 16 sub-fields each having a width of 4 bytes. The 16 sub-fields are used for storing 16 pieces of measured-value data Nos. 1 to 16. As shown in the figure, each piece of measured-value data comprises an eight-bit unit code, a four-bit sign field, a four-bit exponent field and a 16-bit mantissa field. Some examples of measured-value data are shown in the figure.

The 16 pieces of measured-value data Nos. 1 to 16 are shown in FIG. 25.

What is claimed is:

1. An SDH-communication-network/already existing communication network monitoring and integrating apparatus for integrating a monitoring system of a synchronous digital hierarchy communication network with a monitoring system of an already existing communication network other than said synchronous digital hierarchy communication network, said apparatus comprising:

a first control processor for collecting control data generated in said already existing communication network, supplying said collected control data to a second control processor, receiving control data destined for said already existing communication network from said second control processor and forwarding said control data destined for said already existing communication network to said already existing communication network;

said second control processor for transforming control data received from said first control processor into a control command that can be processed by said synchronous digital hierarchy communication network, outputting said control command that can be processed by said synchronous digital hierarchy communication network to a third control processor, extracting a control command destined for said already existing communication network from control commands received from said third control processor, transforming said extracted control command destined for said already existing communication network into control data that can be processed by said already existing communication network and supplying said control data that can be processed by said already existing communication network to said first control processor; and said third control processor for outputting a control command that can be processed by said synchronous digital hierarchy communication network received from said second control processor to said synchronous digital hierarchy communication network, collecting control commands from said synchronous digital hierarchy communication network and forwarding said collected control commands to said second control processor.

2. An SDH-communication-network/already existing communication network monitoring and integrating apparatus according to claim 1 further comprising:

a first dual-port random-access memory for passing control data from said first control processor to said second control processor and vice versa; and a second dual-port random-access memory for passing a control command from said second control processor to said third control processor and vice versa.

3. An SDH-communication-network/already existing communication network monitoring and integrating apparatus according to claim 1 wherein:

a pair of said second and third control processors are provided for each of a plurality of already existing communication network communication apparatuses to be controlled in said already existing communication network;

each pair of said second and third control processors process control data processed by one of said already existing communication network communication apparatuses for which said pair is provided; and said first control processor outputs control data collected from said already existing communication network to one of said second control processors provided for one of said already existing communication network communication apparatuses generating said control data.

4. An SDH-communication-network/already existing communication network monitoring and integrating apparatus according to claim 3 further comprising a switching control unit for disabling any of said pairs of said second and third control processors in accordance with a channel-failure state.

5. An SDH-communication-network/already existing communication network monitoring and integrating apparatus according to claim 1 wherein, by requesting said second control processor, time information in said synchronous digital hierarchy communication network is acquired and supplied to said already existing communication network as control data.

6. An SDH-communication-network/already existing communication network monitoring and integrating apparatus according to claim 1 wherein said first control processor transmits control data to give an instruction to reset performance data to said already existing communication network at a boundary point of a period of measurement of said performance data carried out by said second control processor and performs correction by adding performance data collected by said first control processor at said boundary point to performance data to be reported by said first control processor to said second control processor for the first time after said boundary point.

7. An operation system apparatus provided in said synchronous digital hierarchy communication network to be used in conjunction with said SDH-communication-network/already existing communication network monitoring and integrating apparatus according to claim 1, said operation system apparatus comprising:

a receiving means for receiving control commands from said synchronous digital hierarchy communication network, extracting a particular control command transmitted by said SDH-communication-network/already existing communication network monitoring and integrating apparatus from said control commands received from said synchronous digital hierarchy communication network and extracting control data generated in said already existing communication network from said particular control command; and a transmitting means for transforming control data for controlling said already existing communication network into an already existing communication network control command and transmitting said already existing communication network control command to said SDH-communication-network/already existing communication network monitoring and integrating apparatus through said synchronous digital hierarchy communication network.

8. An SDH-communication-network/already existing communication network monitoring and integrating apparatus according to claim 1 wherein said already existing communication network is a plesiochronous digital hierarchy communication network.

9. An SDH-communication-network/already existing communication network monitoring and integrating method for integrating a monitoring system of a synchronous digital hierarchy communication network with a monitoring system of an already existing communication network other than said synchronous digital hierarchy communication network, said method comprising the steps of:

collecting control data generated in said already existing communication network;

transforming said control data into a control command that can be processed in said synchronous digital hierarchy communication network;

outputting said control command to said synchronous digital hierarchy communication network;

collecting control commands from said synchronous digital hierarchy communication network;

extracting a control command destined for said already existing communication network from said control commands collected from said synchronous digital hierarchy communication network;

transforming said extracted control command destined for said already existing communication network into control data that can be processed in said already existing communication network;

transmitting said control data that can be processed in said already existing communication network to said already existing communication network; and processing control data processed in said already existing communication network in said synchronous digital hierarchy communication network by receiving a control command resulting from transformation of said control data and extracting said control data to be processed by said synchronous digital hierarchy communication network back from said control command.

10. An SDH-communication-network/already existing communication network monitoring and integrating method according to claim 9 wherein said already existing communication network is a plesiochronous digital hierarchy communication network.

* * * * *